US010099133B2

(12) United States Patent
Tokgoz

(10) Patent No.: US 10,099,133 B2
(45) Date of Patent: Oct. 16, 2018

(54) DIGITAL MULTIMEDIA PLATFORM FOR CONVERTING VIDEO OBJECTS TO GAMIFIED MULTIMEDIA OBJECTS

(71) Applicant: Abrakadabra Reklam ve Yayincilik Limited Sirketi, New York, NY (US)

(72) Inventor: Mehmet Tokgoz, Istanbul (TR)

(73) Assignee: Abrakadabra Reklam ve Yayncilik Limited Sirketi, Istanbul (TR)

( * ) Notice: Subject to any disclaimer, the term of this patent is extended or adjusted under 35 U.S.C. 154(b) by 0 days.

(21) Appl. No.: 15/640,316

(22) Filed: Jun. 30, 2017

(65) Prior Publication Data

US 2018/0001200 A1    Jan. 4, 2018

Related U.S. Application Data

(60) Provisional application No. 62/356,825, filed on Jun. 30, 2016.

(51) Int. Cl.
| | |
|---|---|
| *A63F 9/00* | (2006.01) |
| *A63F 13/52* | (2014.01) |
| *A63F 13/35* | (2014.01) |
| *A63F 13/25* | (2014.01) |
| *A63F 13/42* | (2014.01) |
| *A63F 13/21* | (2014.01) |

(52) U.S. Cl.
CPC .............. *A63F 13/52* (2014.09); *A63F 13/21* (2014.09); *A63F 13/25* (2014.09); *A63F 13/35* (2014.09); *A63F 13/42* (2014.09)

(58) Field of Classification Search
CPC ........... A63F 13/40; A63F 13/42; A63F 13/52
USPC ..................................... 463/1, 30–33, 40–42
See application file for complete search history.

(56) References Cited

U.S. PATENT DOCUMENTS

| | | | |
|---|---|---|---|
| 5,590,262 | A | 12/1996 | Isadore-Barreca |
| 6,362,850 | B1 | 3/2002 | Alsing et al. |
| 7,769,819 | B2 | 8/2010 | Lerman et al. |
| 7,938,727 | B1 | 10/2011 | Konkle |
| 2005/0020359 | A1 | 1/2005 | Ackley et al. |
| 2008/0291218 | A1 | 11/2008 | Sheng et al. |
| 2014/0047413 | A1 | 2/2014 | Sheive et al. |
| 2014/0282743 | A1 | 9/2014 | Howard et al. |
| 2015/0293675 | A1 | 10/2015 | Bloch et al. |

OTHER PUBLICATIONS

International Search Report and Written Opinion dated Sep. 28, 2017 in International Patent No. PCT/US2017/040494, 7 pages.

*Primary Examiner* — Omkar Deodhar
*Assistant Examiner* — Ross Williams
(74) *Attorney, Agent, or Firm* — Kilpatrick Townsend & Stockton LLP

(57) ABSTRACT

Embodiments provide an interactive digital multimedia platform for converting existing video objects to gamified multimedia objects and a method for the same. An editor-user of the platform may modify an existing video object while the content of the video object is playing. The editor-user may provide an editing input to the platform for assigning a gaming gesture at a point in video timeline associated with the video content thereby generating a modified video content. The modified video content may be a gamified multimedia object generated from the original video object. The platform also allows multiple editor-users to assign a plurality of gaming gestures at a plurality of points in video timeline associated with the existing video content. As such, the platform is collaborative.

17 Claims, 16 Drawing Sheets

DIGITAL MULTIMEDIA PLATFORM FOR CONVERTING VIDEO OBJECTS TO GAMIFIED MULTIMEDIA OBJECTS

CROSS-REFERENCES TO RELATED APPLICATIONS

This application claims the benefit of U.S. Provisional Patent Application No. 62/356,825, filed Jun. 30, 2016, entitled "Digital Multimedia Platform for Converting Video Objects to Gamified Multimedia Objects," which is incorporated herein by reference in its entirety.

BACKGROUND OF THE INVENTION

In conventional video sharing services, platforms, and/or applications, users have the passive role of playing the video content, whether the content can be viewed only one time or multiple times. The conventional video sharing platforms do not allow the users to alter the existing video content.

A standard video content that is embedded on hardware and/or software can no longer be modified by viewers. That is, viewers can only play an existing video content as it was stored. Even though some video players allow viewers to provide input to select one of a limited number of alternative video timelines to play, these video timelines are already stored as part of the video content and provided to the viewer. The viewer simply selects one of the available contents to be played on the video player without altering the existing video content.

Embodiments of the invention address this and other problems, individually and collectively.

BRIEF SUMMARY OF THE INVENTION

The present disclosure relates generally to an interactive digital multimedia platform for converting existing video objects to gamified multimedia objects and a method for the same. The digital multimedia platform may run on a server computer. An editor-user of the platform may modify an existing video object in real-time (i.e. while the content of the video object is playing). The editor-user may provide an editing input to the platform for assigning a gaming gesture at a point in video timeline associated with the video content thereby generating a modified video content. The modified video content may be a gamified multimedia object generated from the original video object. That is, the modified video content maybe a game version of the existing video object. Embodiments allow for converting existing videos (e.g. movie clips, motion pictures, personal videos, livestreams, etc.) into games. The platform also allows multiple editor-users to assign a plurality of gaming gestures at a plurality of points in the video timeline associated with the existing video content. As such, the platform is collaborative.

In addition, a viewer-user of the platform may play the modified video content and provide a gaming input to the platform. That is, the viewer-user may play the modified video content as a video game and play the video game by providing the gaming input at the relevant point in video timeline associated with the modified video content. If the gaming input is same as the gaming gesture associated with the point in the video timeline associated with the modified video content (as defined by the editor-user), the viewer-user may be assigned a gaming credit (e.g. collect points) and continue viewing the remainder of the modified video content or an alternative video content. On the other hand, if the gaming input is different from the gaming gesture associated with the point in video timeline associated with the modified video content, the viewer-user may be prevented from viewing the remainder of the modified video content (e.g. game over) or continue viewing the remainder of the video content without collecting points or may view a different video content.

Embodiments provide a method performed by a server computer. The method includes receiving a video object using a digital multimedia platform, the video object having a video content and a video timeline associated with the video content. The video object is executed on the digital multimedia platform, wherein executing the video object displays the video content according to the video timeline. The method further includes receiving an editing input from a first editor-user to assign a gaming gesture at a point in the video timeline while displaying the video content. The gaming gesture is associated with the point in the video timeline to generate a gamified multimedia object having a modified video content and a video timeline associated with the modified video content. The gamified multimedia object is stored using the digital multimedia platform.

In some embodiments, the method may also include executing the gamified multimedia object using the digital multimedia platform, wherein executing the gamified multimedia object displays the modified video content according to the timeline associated with the modified video content. A first gaming input is received from a viewer-user at a point in the timeline associated with the modified video content while the gamified multimedia object is executed. If the first gaming input is substantially similar to the gaming gesture associated with the point in the video timeline, a gaming credit is assigned to the viewer-user, and a first video content associated with the gaming gesture is displayed. If the first gaming input is different from the gaming gesture associated with the point in the video timeline, a second video content associated with the first gaming input may be displayed, or the modified video content may be rewound by a predetermined amount, and a rewound portion of the modified video content may be replayed. A second gaming input may be received from the viewer-user at the point in the timeline associated with the modified video content while the gamified multimedia object is executed.

According to various embodiments, the method may include listening to user inputs through available input devices when the gaming gesture is displayed while executing the gamified multimedia object using the digital multimedia platform. The user inputs include the first gaming input and the second gaming input. The method may also include displaying a transparent layer on or in proximity of the modified video content to receive the first gaming input or the second gaming input. The first gaming input or the second gaming input includes one or more of a haptic input, a vocal input, an eye movement input or a signal received from a control device. The gaming gesture may be associated with an allocated time during which the gaming gesture is to be performed. In some embodiments, the gaming gesture may be associated with an allocated time during which the first gaming input is to be received. In such embodiments, the method may also include rewinding the modified video content by the predetermined amount, and replaying the rewound portion of the modified video content when no gaming input is received during the allocated time.

In various embodiments, the method may include receiving an editing input from a second editor-user to assign a second gaming gesture at a second point in the video timeline while displaying the modified video content. The second gaming gesture is associated with the second point in the video timeline to generate a second gamified multimedia object having a second modified video content. The second gamified multimedia object is stored using the digital multimedia platform. Associating the gaming gesture with the point in the video timeline may include associating the gaming gesture with one or more frames of the video content. The video timeline associated with the modified video content may be the same as the video timeline associated with the video content.

In various embodiments, the method may include displaying a gesture pane including a plurality of gaming gestures, wherein the gaming gesture is selected among the plurality of gaming gestures. The gaming gesture is overlaid on a frame of the video content displayed at a time when the editing input is received. In some embodiments, the video object includes a live video stream.

Embodiments may also provide a system including one or more processors; and a non-transitory computer readable storage medium communicatively coupled with the one or more processors. The readable storage medium comprises code, executable by the one or more processors, to implement the above-described methods.

The foregoing, together with other features and embodiments will become more apparent upon referring to the following specification, claims, and accompanying drawings.

DETAILED DESCRIPTION OF THE INVENTION

Figure 1:
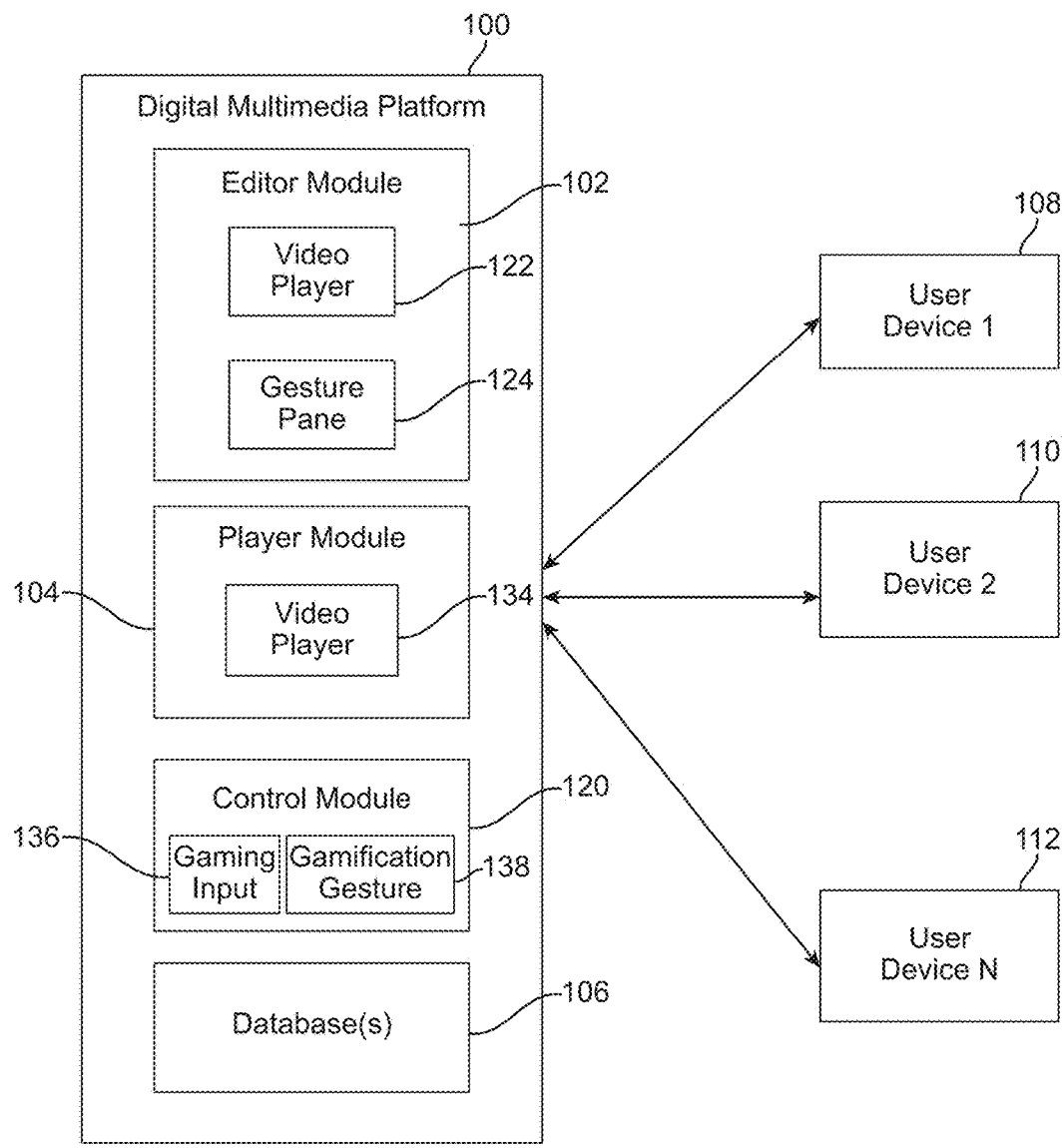
FIG. 1 is a block diagram illustrating a representative operating environment for an exemplary embodiment of the present invention.

In the following description, for the purposes of explanation, specific details are set forth in order to provide a thorough understanding of embodiments of the invention. However, it will be apparent that various embodiments may be practiced without these specific details. For example, circuits, systems, algorithms, structures, techniques, networks, processes, and other components may be shown as components in block diagram form in order not to obscure the embodiments in unnecessary detail.

It is to be understood that embodiments of the invention may include more or fewer than the components shown individually in a diagram. The figures and description are not intended to be restrictive.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The present disclosure relates generally to an interactive digital multimedia platform for converting existing video objects to gamified multimedia objects and a method for the same. According to various embodiments, any existing video objects (e.g. an object having a video content) may be converted into a video game using the digital multimedia platform running on a server computer. For example, an existing movie clip or a video recorded using a user device (e.g. a mobile phone) may be converted into a video game using the interactive digital multimedia platform ("platform") described herein. A plurality of users may interact with the platform to edit, view, interact with the video content stored by or accessible using the platform.

According to various embodiments, the platform may have editor-users and/or viewer-users. In some embodiments, a user may be an editor-user and a viewer-user. An editor-user of the platform may modify an existing video object while the content of the video object is playing. The editor-user may provide an editing input to the platform for assigning a gaming gesture at a point in video timeline associated with the video content thereby generating a modified video content. The editor-user may assign the gaming gesture to a specific frame being displayed at a given point (e.g. at time t1) in the video timeline (e.g. running from t0 to tn, where t0<t1<tn), or the editor-user may assign the gaming gesture to the point in the video timeline. The modified video content may be a gamified multimedia object generated from the original video object. The platform also allows multiple editor-users to assign a plurality of gaming gestures at a plurality of points in video timeline associated with the existing video content. As such, the platform is collaborative.

In some embodiments, a viewer-user (referred also as "a player-user") of the platform may play the modified video content and provide a gaming input to the platform. That is, the viewer-user may display the modified video content as a video game and play the video game by providing the gaming input at the relevant point in video timeline associated with the modified video content. A control module of the platform may determine whether the gaming input substantially matches the gaming gesture associated with the frame and/or the point in the video timeline. If the gaming input substantially matches (e.g. is substantially the same as) the gaming gesture associated with the frame and/or point in the video timeline (e.g. the expected gaming gesture), the viewer-user may be assigned a gaming credit (e.g. collect points) and continue viewing the remainder of the modified video content or an alternative video content. On the other hand, if the gaming input is different from the expected gaming gesture, the viewer-user may be given another chance to provide a new gaming input, may be prevented from viewing the remainder of the modified video content (e.g. game over) or may continue viewing a different video content.

In some embodiments, if no gaming input is received during the allocated time, or when the received gaming input is different from the expected gaming gesture, the control module may rewind the video by a predetermined time (e.g. n seconds, where n=1, 2, 3, etc.) and replay the modified video content until the correct gaming input (e.g. the gaming input that substantially matches the gaming gesture associated with the frame and/or point in the video timeline) is received.

Before discussing specific embodiments and examples, some descriptions of terms used herein are provided below.

A "server computer" may typically be a computer or cluster of computers. For example, the server computer can be a large mainframe, a minicomputer cluster, or a group of servers functioning as a unit. In one example, a server computer may be a database server coupled to a Web server. Data transfer and other communications between components such as computers may occur via any suitable wired or wireless network, such as the Internet or private networks.

A "digital multimedia platform" may refer to a video platform that enables users to upload, convert and playback video network over a network, such as the Internet. A plurality of users may interact with the digital multimedia platform using respective user devices such as user computers, smart phones, tables and the like. The digital multimedia platform may be implemented on or may otherwise use a server computer. The digital multimedia platform may include one or more modules that, along with a processor, perform the functions described herein.

A "video object" may refer to a container that includes a video content and an associated video timeline such that the video content is played according to the associated video timeline. Executing a video object on a computing device may display the video content of the video object according to the associated video timeline. A video object may include individually manipulated film, media, stream, and/or interactive video content that may have already been created or modified by user input.

A "video content" may refer to a series of frames that form a video that can be played on an electronic device (e.g. a computing device, a user device, a smart phone, etc.) according to a video timeline associated with the video content.

A "video timeline" may refer to a chronological sequence of frames that dictates which frame will be displayed at which time when a video content is played.

A "gamified multimedia object" may refer to a container that includes a gamified video content and an associated video timeline, such that the gamified video content is played according to the associated video timeline. Executing the gamified multimedia object on an electronic device (e.g. a computing device, a user device, a smart phone, etc.) may display the gamified video content according to the associated video timeline.

A "gaming gesture" may refer to an action that needs to be performed in a video game (e.g. a gamified video content) at a specified time in a video timeline associated with the video game. The gaming gesture may include any type of input that can be provided by the user including gestures performed by the user (including but not limited to a body part movement such as finger, hand, head, eye or mouth movement, a noise made by the user or the like) or by the user device (shaking, vibrating, tilting, etc.). The gaming gesture may be associated with an allocated time where the gaming gesture needs to be performed.

A "gaming input" may refer to an input in a video game to control an object or character in the game. According to various embodiments, a gaming input maybe the input provided to the digital multimedia platform by a user at a point in a video timeline to satisfy the gaming gesture defined at that point of the video timeline. In some embodiments, the gaming gesture may be associated with an allocated time where the gaming input needs to be received by the interactive digital multimedia platform.

Figure 2:
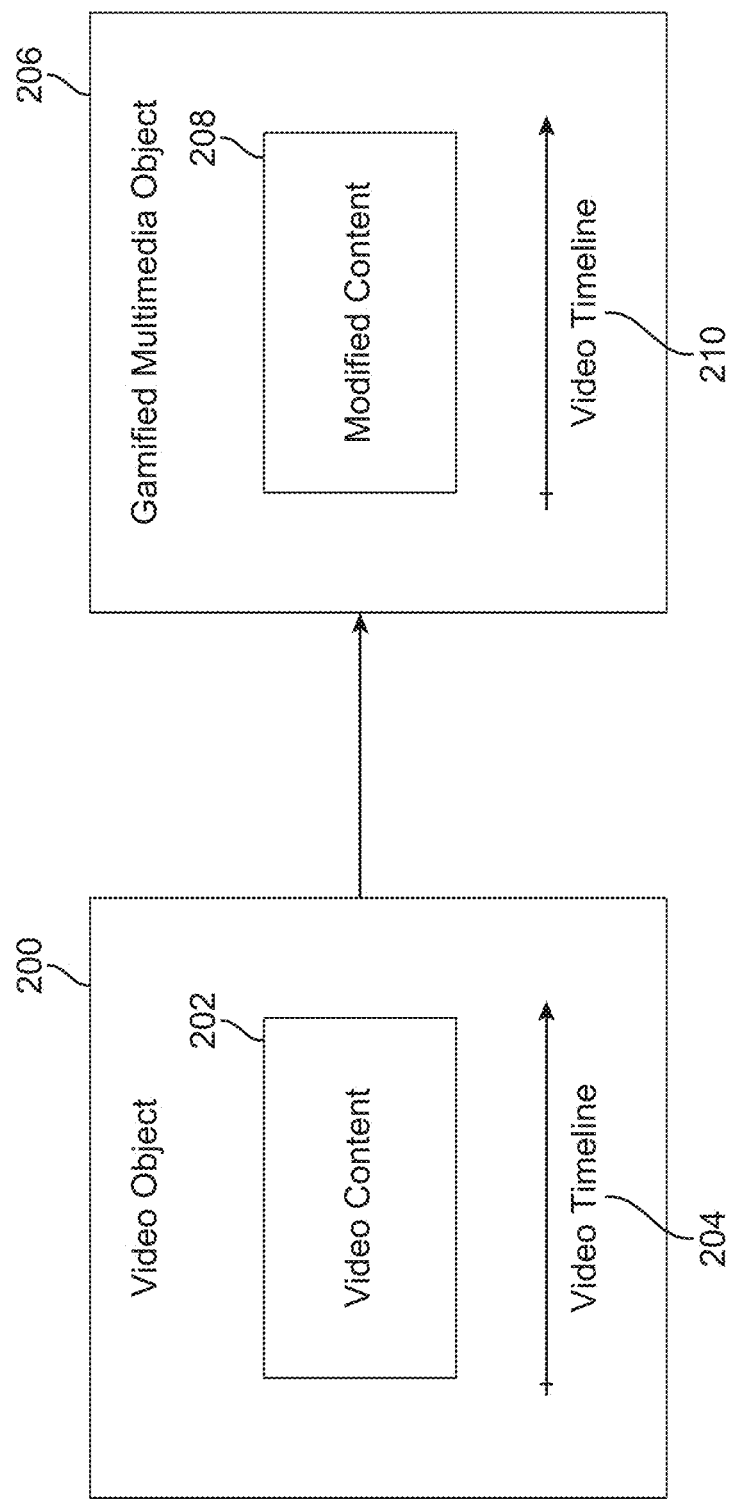
FIG. 2 is a block diagram illustrating a gamified multimedia object and a corresponding video object for an exemplary embodiment of the present invention.

FIG. 1 illustrates a digital multimedia platform 100 for converting existing video objects to gamified multimedia objects. As illustrated in FIG. 2, a video object 200 may be a container (e.g. a file) that includes a video content 202 and a video timeline 204 associated with the video content 202. When the video object 200 is executed on an electronic device (e.g. a computing device, a user device, a smart phone, etc.), the video content 202 may be played on a video player according to the video timeline 204. According to various embodiments, the video content 202 may be a virtual reality (VR) video content and/or augmented reality (AR) video content.

The digital multimedia platform 100 illustrated in FIG. 1 may allow users to modify the video object 200 to generate a gamified multimedia object 206 by associating one or more gaming gestures with one or more frames, and/or points or periods in the video timeline 204. The gamified multimedia object 206 may include a modified video content 208 and a video timeline 210 associated with the modified video content 208. When the gamified multimedia object 206 is executed on an electronic device (e.g. a computing device, a user device, a smart phone, etc.), the modified video content 208 may be played on a video player according to the video timeline 210. In some embodiments, the modified video content 208 may include one or more visual cues (e.g. availability indicators) associated with the gaming gestures overlaid on the video content 202. The visual cues may indicate to the viewer-user (or player-user) where a gaming input is expected from the viewer-user. The video timeline 210 may be the same as the video timeline 204 or maybe a different video timeline.

Referring back to FIG. 1, the digital multimedia platform 100 may include an editor module 102, a player module 104 and a control module 120. A plurality of users may access to and interact with the digital multimedia platform 100 using their respective user devices 108, 110, 112. A user may select an existing video object stored, for example, on a database 106 and modify the video content associated with the video object on the editor module 102. In some embodiments, the user may upload a video file (e.g. a video object) to the digital multimedia platform 100 and modify the uploaded video file. The video file uploaded by the user may be stored in the database 106. According to some embodiments, multiple users may access the digital multimedia platform 100 substantially simultaneously. The users may modify the same video object or different video objects. The database 106 may be stored as a part of the digital multimedia platform 100 or may be external to and accessible by the digital multimedia platform 100.

In some embodiments, a user (e.g. an editor-user) may modify the selected video object by assigning at least one gaming gesture to a frame and/or a point or period in video timeline associated with the selected video object. For example, the user may access the editor module 102 to view the video content of the selected video object on a video player 112 provided by the editor module 102. The editor module 102 may also provide a gesture pane 124 illustrating a plurality of gaming gestures that can be selected by the user. For example, the user may select a gaming gesture from the gesture pane 124 and overlay the selected gaming gesture on the video content (e.g. on a frame displayed at time t1 of the video timeline) by drag-and-drop operation. That is, the gaming gesture may be overlaid on a frame of the video content displayed at a time when the editing input (assigning the gaming gesture) is received. By this action, the gesture data containing the type of the gesture and its representation details on the screen (e.g. the coordinates on the screen where an icon representing the gaming gesture should be displayed) is stored with the start and end times (or timestamps) designated in the editor in a metadata object (with a data container such as JSON, XML or like), which may then be embedded to or supplied alongside the video through the platform. One of ordinary skill in the art will appreciate that the gaming gesture may be selected and overlaid on the video content using any other technique(s), such as selecting the gaming gesture on a drop-down menu, and associating the selected gaming gesture with a frame and/or a point in the video timeline (e.g. an interaction point) by entering a value identifying the frame and/or the video timeline point in a field provided by the editor module 102. The user may thereby generate a gamified multimedia object, which can be stored in a database, such as database 106. The gamified multimedia object may be accessible by other users. For example, the user or the other users may play the gamified multimedia object using the player module 104 of the digital multimedia platform 100 using their respective user devices 108, 110, 112.

According to various embodiments, a user (e.g. a viewer-user) may interact with the gamified multimedia object by providing gaming inputs while viewing the gamified multimedia object. For example, the user may access the player module 104 of the digital multimedia platform 100 to view the modified video content of the gamified multimedia object on a video player 134 provided by the player module 104. When the user sees the visual cues (e.g. availability indicators) overlaid on the modified video content expecting a gaming input, the user may provide the gaming input at a given point in the video timeline. While the video is being played, whenever a gesture associated with the current timeframe of the video begins, the device listens to the user inputs from all available input devices when the gaming gesture is displayed while executing the gamified multimedia object using the digital multimedia platform. For example, a transparent layer (e.g. illustrated in FIG. 3 as transparent interactive content layer 302) may be displayed on or in proximity of the video to receive user input such as sensory inputs (e.g. touch or any finger gestures), and/or sensor inputs (e.g. from a gyrometer) associated with the video. If the gaming input provided by the user is the same as the gaming gesture assigned to the specific point in the video timeline, the user may earn gaming credit and continue playing the game, e.g. the user may continue watching the remainder of the gamified multimedia object and provide additional gaming inputs as necessary.

According to various embodiments, the digital multimedia platform 100 includes a control module 120. The control module 120 may compare the gaming input 136 received from the payer-user to the gaming gesture 138 (i.e. the expected gaming gesture) previously set by the editor-user. If the control module 120 determines that the gaming input 136 is substantially similar to (e.g. same with) the previously set gaming gesture 138, the control module 120 may assign gaming credit to the user and play the remainder of the gamified multimedia object. On the other hand, if the control module 120 determines that the gaming input 136 is not substantially similar to (e.g. is different from) the previously set gaming gesture 138, the control module 120 may (a) rewind the gamified multimedia object by a pre-determined amount (e.g. 2 or 3 seconds, or a few frames) and replay the rewound portion of the gamified multimedia object to allow the user to provide another gaming input, (b) stop playing the gamified multimedia object, (c) play the gamified multimedia object according to an alternative timeline, or (d) continue playing the remainder of the gamified multimedia object as a regular (e.g. non-gamified) multimedia object (e.g. as the original, non-modified video object).

In some embodiments, the video object may be a live video stream. The live video stream may be streamed with a predetermined delay, e.g. 20 seconds. An editor-user interacting with the digital multimedia platform 100 may gamify the live video stream by including interactive actions and/or gaming gestures to the live video stream. For example, the live video stream may be associated with a sports game (e.g. basketball game). The editor-user may insert a question, e.g. will the player make the shot, in the video timeline of the live video stream. A viewer-user may interact with the live video stream by providing an answer to the question, and earn gaming credit if the answer is correct (e.g. the prediction of the viewer-user is what happens in the live video stream). In another embodiment, the editor-user may insert a gaming gesture that expects a gaming input from the viewer-user. For example, if the live video stream is that of a soccer game, the editor-user may insert a gesture that expects the viewer-user to guess whether the soccer player on the screen will go left or right. The viewer-user may interact with the live video stream by providing a gaming input (e.g. swipe left on the screen or tilt left with a game control instrument), and earn gaming credit if the answer is correct (e.g. the prediction of the viewer-user is what happens in the live video stream such as the soccer player runs left). As such, embodiments may convert live video streams into interactive gamified video streams.

Even though various embodiments are discussed herein with reference to video objects, the digital multimedia platform 100 may take any type of input such as video and/or audio signals from a television, cable box, DVD player, and the like. Similarly, the gaming input provided by the users may be in various forms such as haptic input, vocal input, visual input (e.g. gathered by tracking the eye movement) or signal received from a control device (e.g. mouse, joystick, game console, etc.). Any sensor data from the user device like an accelerometer, a gyroscope, a compass, a barometer, a camera (e.g. used as a code scanner to scan, for example, a matrix barcode or a two-dimensional barcode) could be used to provide a gaming input. In some embodiments, a Global Positioning System (GPS) signal from the user device (e.g. a signal indicating a current location of the user device) may be used as a gaming input.

According to various embodiments, the users may access the digital multimedia platform 100 using a mobile application (e.g. an "app") 300 designed to run on user computing devices such as computers, laptops, mobile communication devices (e.g. smartphones), tablet computers, and the like. The mobile application 300 may connect to the digital media platform running on a server computer over a network, such as the Internet or a local area network. Connectivity with server computer can be activated or deactivated on device in order to save the battery life of device. The connectivity can be accomplished using a variety of networking technologies, including, for example, local area and wide area networks, Wi-Fi, Wi-MAX, COMS, 3G, 4G, LTE and the like.

Figure 3:
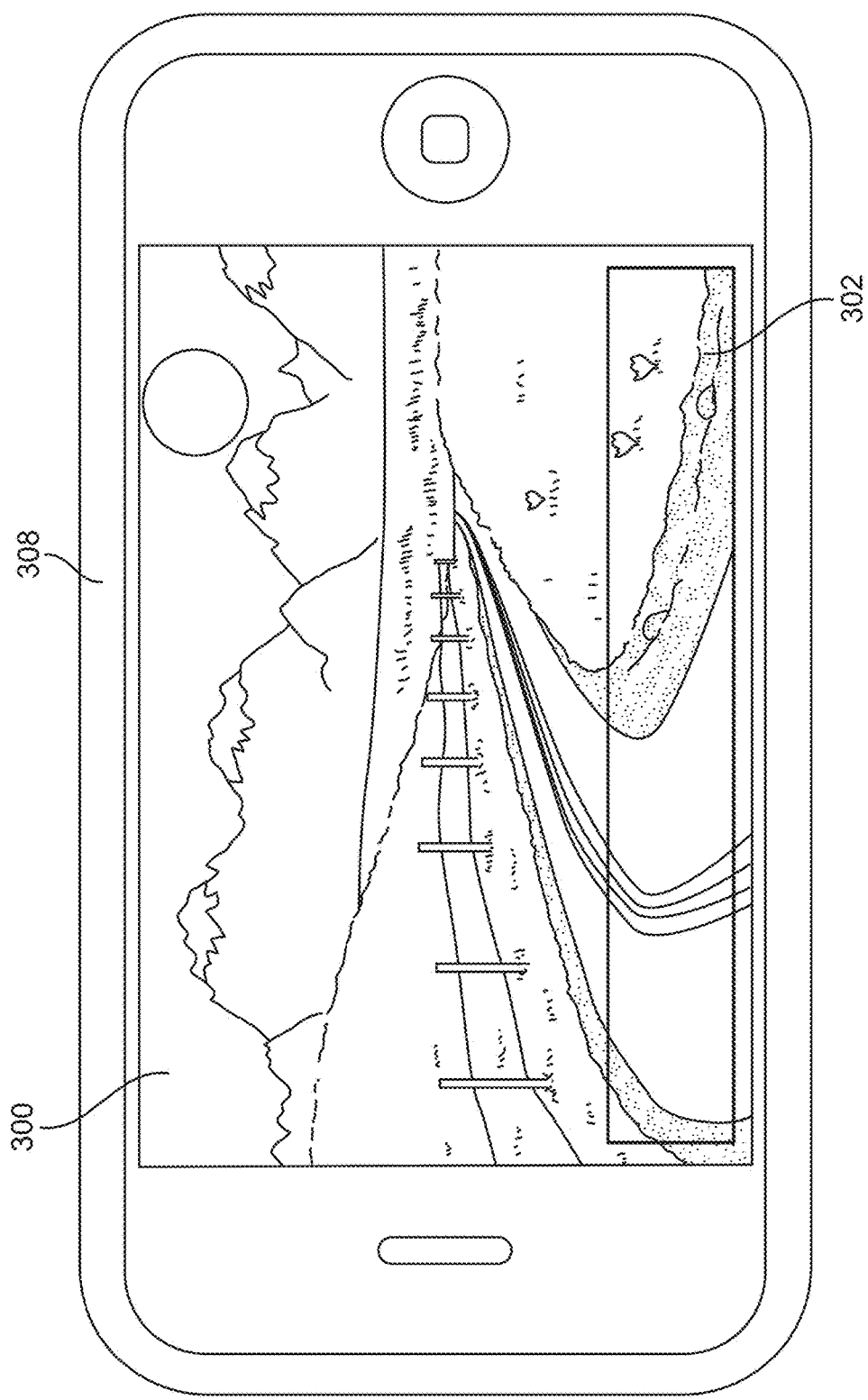
FIG. 3 illustrates a mobile application running on a user device for an exemplary embodiment of the present invention.

FIG. 3 illustrates the mobile application 300 running on a user device 308. The mobile application 300 may display the video player 122 or 134 provided by the editor module 102 or the player module 104, respectively, of the digital multimedia platform 100. According to various embodiments, when the mobile application 300 is activated on the user device 308, the native video camera function of the user device 300 may also be activated to allow the user to capture video and store the video on the database 106 using the digital multimedia platform 100. In addition, the user may capture video and gamify the captured video into a gamified multimedia object in real time, as the video is captured. The gamified multimedia object may then be stored on the database 106.

According to various embodiments, a transparent interactive content layer 302 may be overlaid on the video content 202 as illustrated in FIG. 3. The transparent interactive content layer 302 may include control widgets such as buttons for the user to provide an input and/or a timer. The timer may indicate the remaining time where the user can provide a gaming input. The timer can be represented as a clock, a bar, and/or any suitable textual and/or graphical representation of time. The timer can toggle between a visible and hidden display, which can be invoked automatically and/or by viewer interaction. It is to be appreciated that there are various graphical and textual forms that interactive controls, timers, and other elements can take, such as buttons, switches, dials, sliders, spinners, menus, progress bars, dialogs, popups, tabs, links, ribbons, graphical overlays, and the like. The elements on the transparent interactive content layer 302 can be any size or color, and can be positioned anywhere on or around the displayed video content. The elements can be shown as icons, pictures, animations and/or videos.

In some embodiments, the user may provide gaming inputs by interacting with the screen to execute control actions, including control gestures (e.g. touches) such as swiping, pinching, or control movements such as rotating, shaking. In some embodiments, the control gestures may be added to the transparent interactive content layer 302 that allow a viewer to select an option during video playback.

Figure 4:
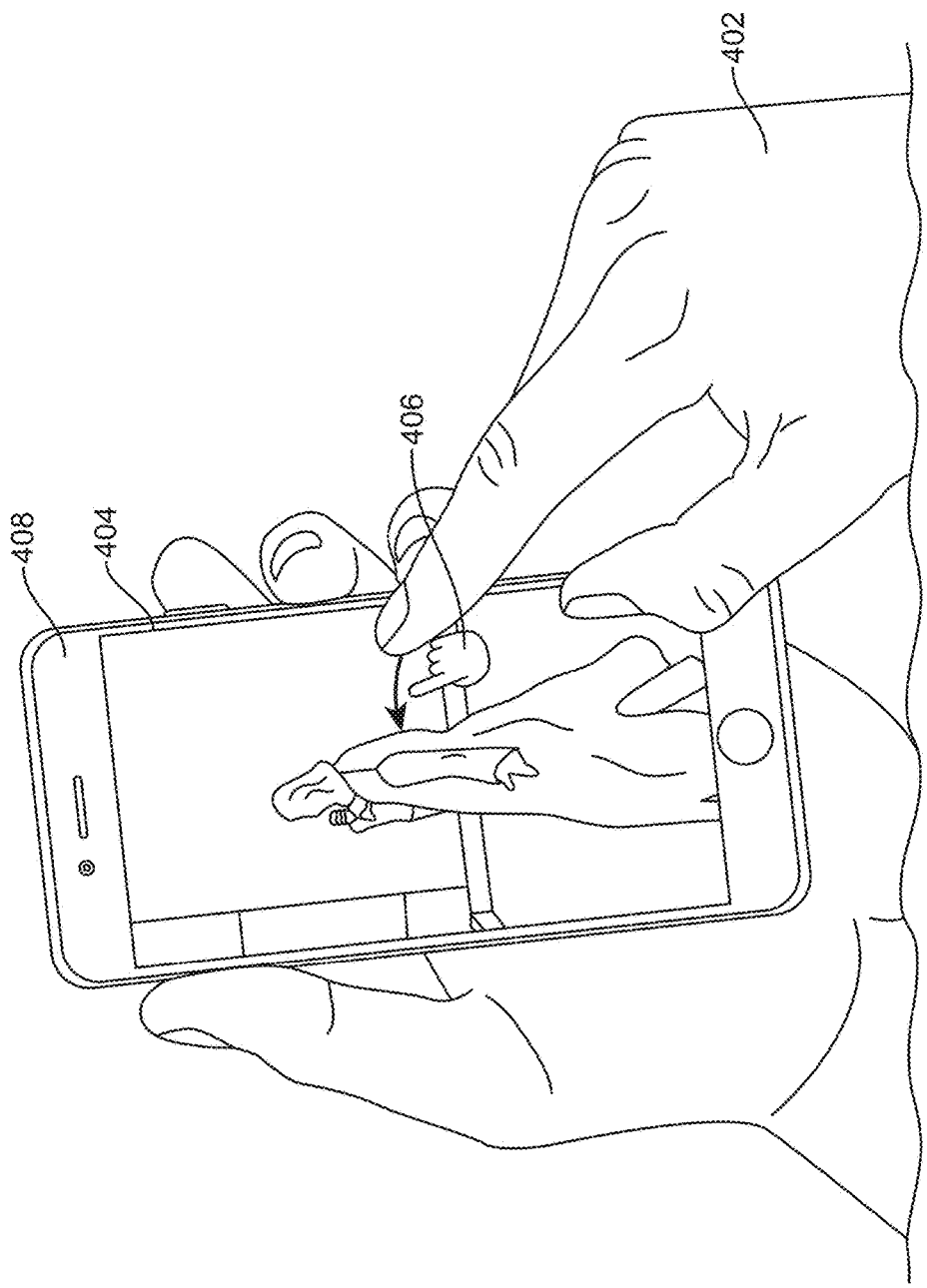
FIG. 4 illustrates a viewer-user interacting with the mobile application running on a user device for an exemplary embodiment of the present invention.

FIG. 4 illustrates a viewer-user (or a player-user) 402 interacting with the mobile application 400 running on a user device 408. The mobile application 400 displays a gamified video content 404 on the user device 408 using the player module 104 of the digital multimedia platform 100. For example, the user device 408 may access the digital multimedia platform 100 (running on a computer server) over a network, such as the Internet. The user may have an account set up to have access to the digital multimedia platform 100. Upon providing the unique User ID and password, the user may be granted access to use the digital multimedia platform 100. The mobile application 400 may permit users to create and maintain accounts by connecting with their accounts at other popular social media sites such as Facebook, Twitter, Google+. Once the user has created an account, and logged into the mobile application 400, the user can begin capturing a video or select stored videos from the database associated with the digital multimedia platform 100.

The gamified video content 404 may be a gamified version of a motion picture including one or more gestures 406 overlaid on the motion picture. For example, a swipe left or move left gesture 406 may be displayed over the motion picture. If the user provides a gaming input swiping left or moving a control left within the allocated time, the motion picture may continue playing and the user may receive gaming credit (e.g. gaming points). According to various embodiments, the motion picture (e.g. the displayed video content) does not stop or is not interrupted to receive an input from the viewer-user in order to provide a seamless viewing experience. If the viewer-user does not provide any gaming input in the allocated time, the control module 120 of the digital multimedia platform 100 may determine that the user does not wish to play the game and may continue streaming the remaining portion of the motion picture (e.g. the video content). If the user fails to provide the required gaming input within the allocated time (e.g. the user does not provide an input or the provided gaming input is not substantially same with the expected gaming gesture), the control module 120 may rewind the motion picture by a pre-determined amount and replay the portion where the user input is requested. In some embodiments, if the user fails to provide the required gaming input within the allocated time, the control module 120 may continue playing the motion picture without the user receiving any gaming credit, or may stop playing the motion picture (e.g. game over). In some embodiments, an alternative video may be played instead of the remainder of the motion picture if the user fails to provide the required gaming input.

As provided above, FIG. 4 illustrates the player aspect of the digital multimedia platform 100. FIGS. 5-10 discussed below illustrate the editor aspect of the digital multimedia platform 100.

Figure 5:
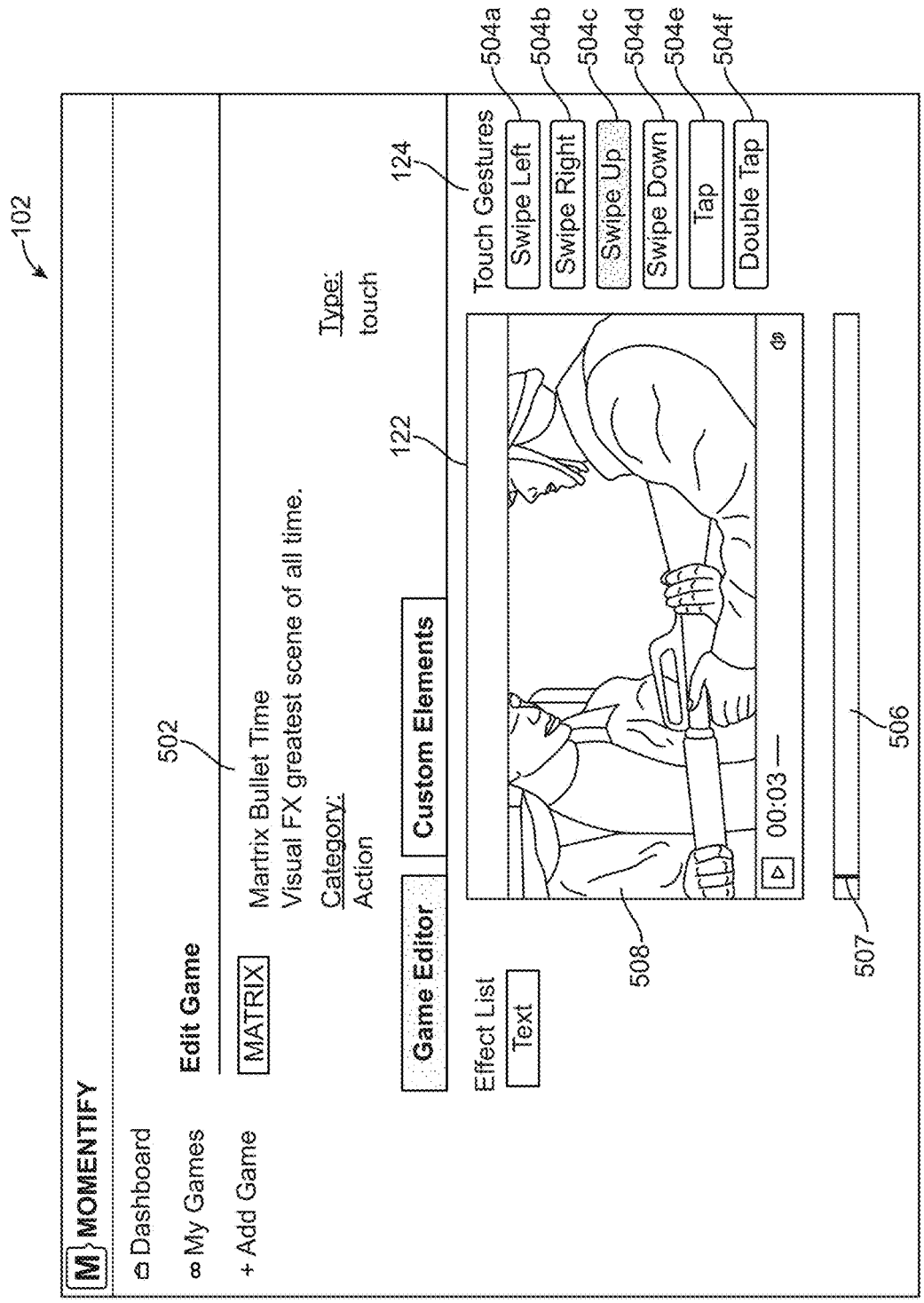
FIGS. 5-7 illustrate a adding a first gaming gesture to an existing video content for an exemplary embodiment of the present invention.
Figure 6:
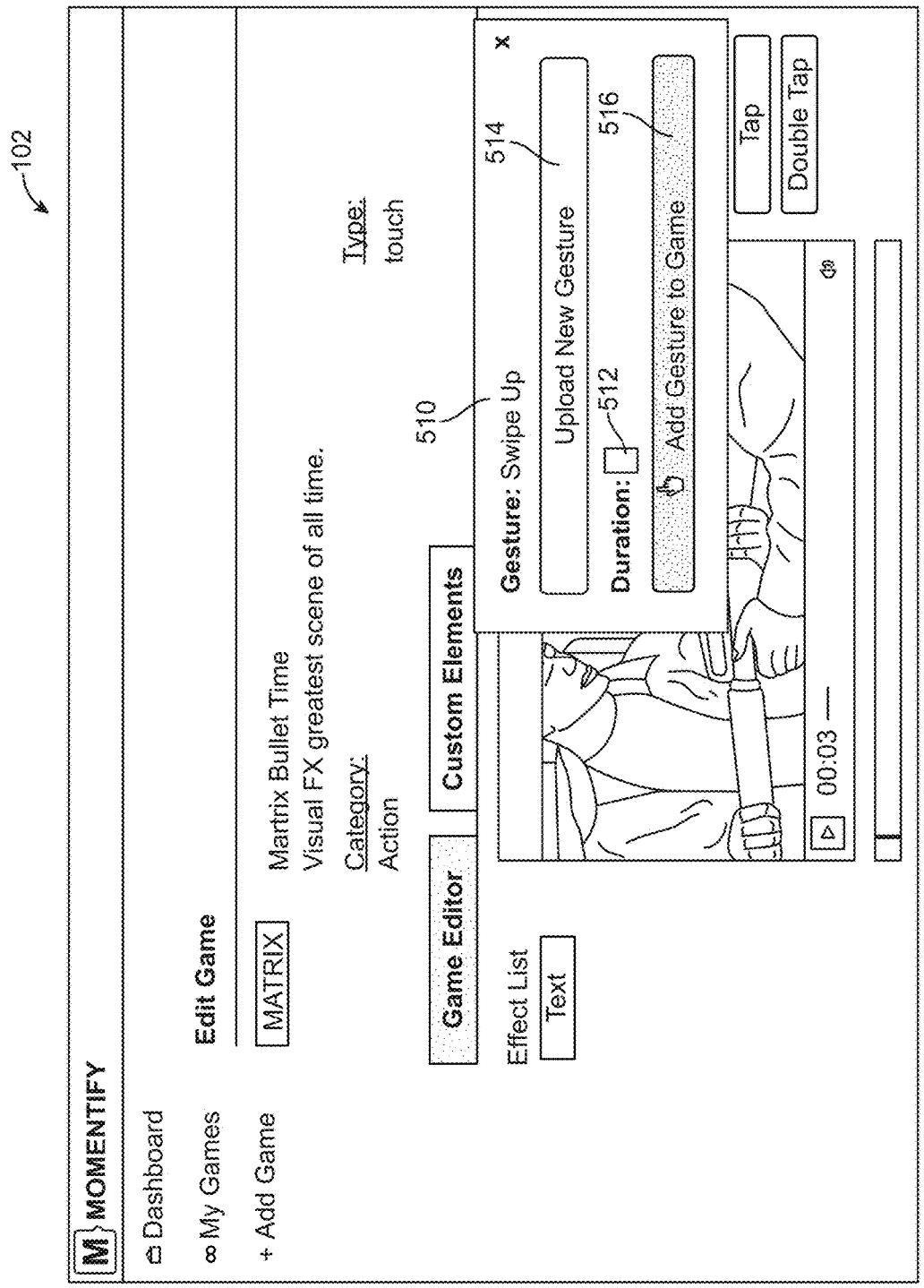
Figure 7:
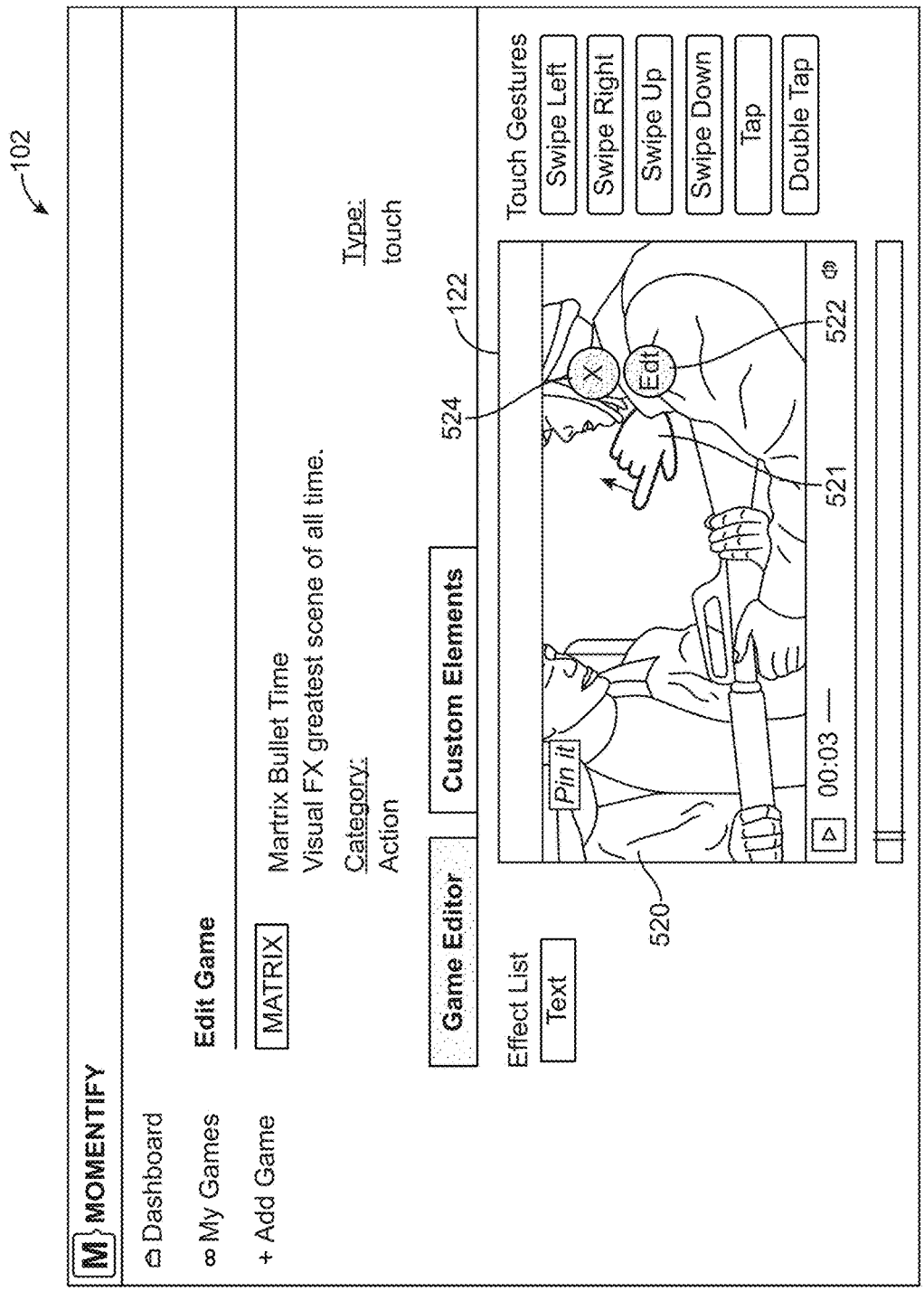

FIGS. 5-7 illustrate adding a gaming gesture (e.g. a first gaming gesture or a subsequent gaming gesture) to an existing video content. For example, the video content may be a motion picture stored on a database. The user may select a video object from a database 106 using the digital multimedia platform 100. The editor module 102 may also include an information pane 502 that provides information about the selected video object, such as the file name, a category associated with the video object, a description of the video content associated with the video object, etc.

The selected video object may be executed (e.g. played or streamed) on the editor module 102 of the digital multimedia platform 100. Executing the video object may play the video content associated with the video object according to an associated video timeline. This is illustrated in FIG. 5 as the motion picture frame 508 displayed on the video player 122 of the editor module 102 according to the video timeline 506 associated with the motion picture. A control widget 507 may be illustrated in connection with the video timeline 506 to show the place (e.g. location) of the displayed frame 508 in relation to the rest of the video content. It may be possible to move the control widget 507 back and forward on the video timeline 506 to have a different frame of the video content displayed on the video player 122.

The editor module 102 may also include a gesture pane 124 that includes a plurality of control buttons 504*a*, 504*b*, 504*c*, 504*d*, 504*e* and 504*f* for adding gaming gestures to the video content. For example, the gaming gestures may include swipe left using control button 504*a*, swipe right using control button 504*b*, swipe up using control button 504*c*, swipe down using control button 504*d*, tap using control button 504*e* and double tap using control button 504*f*. One of ordinary skill in the art will appreciate that the association between the control buttons and the gaming gestures is for illustration purposes and should not be construed as limiting. The control buttons may be listed according to any listing and may be associated with a subset or additional gaming gestures than those illustrated in FIG. 5. According to the exemplary embodiment illustrated in FIG. 5, the user may select the control button 504*c* (illustrated as shaded in FIG. 5) for adding a "swipe up" gesture to the video content (e.g. to the motion picture frame 508 displayed on the video player 122). The user may add the gaming gesture to a desired location on the frame 508 displayed on the video player 122 by a drag-and-drop action. The editor module 102 may determine the location on the displayed motion picture frame 508 by, for example, determining the coordinates (e.g. x, y coordinates) of the location. The editor module 102 may then associate the gaming gesture "swipe up" with the determined coordinates as well as with the point in timeline (e.g. with time=0:03, as illustrated in FIG. 5).

FIG. 6 illustrates what happens after the user adds the gaming gesture in FIG. 5. As illustrated in FIG. 6, adding the gaming gesture to the video content (e.g. the frame 508 of the video content) may cause a pop-up screen 510 to be displayed on the editor module 102. The pop-up screen 510 may ask the user to confirm the addition of the new gaming gesture (e.g. "swipe up") to the displayed motion picture frame 508. The pop-up screen 510 may also ask the user to specify the duration 512 for the gaming gesture. The duration 512 of the gaming gesture may be the allocated time for a player-user to provide a gaming input. If the player-user does not provide the gaming input within the allocated time, the control module 120 of the digital multimedia platform 100 may rewind, stop or resume playing the video content or the gamified multimedia object, as discussed above. In some embodiments, the duration 512 may be the same for all gaming gestures, and the user may not be required to enter a duration for each gaming gesture. The user may be allowed to modify the preset duration for one or more gaming gestures defined by the user.

The pop-up screen 510 allows the user to add a different gaming gesture (different from the previously selected gaming gesture, i.e. "swipe up" in the exemplary embodiment illustrated in FIG. 6) by selecting a first tab 514 or to accept the addition of the previously selected gaming gesture (e.g. "swipe up" in the exemplary embodiment illustrated in FIG. 6) to the video content by selecting a second tab 516.

FIG. 7 illustrates the modified gamified video content 520 displayed on the video player 122 of the editor module 102. The modified gamified video content 520 (e.g. the gamified frame of the initially selected video content) includes the visual representation of the gaming gesture 521. For example, in the exemplary embodiment illustrated in FIGS. 5-7, the added gaming gesture is "swipe up". Accordingly, the visual representation of the gaming gesture 521 is a hand with an up arrow displayed next to the index finger. During the editing phase, additional editing options (e.g. edit button 522 to select a different gaming gesture or delete button 524 to delete the selected gaming gesture) associated with the visual representation of the gaming gesture 521 may be displayed on the video player 122.

Figure 8:
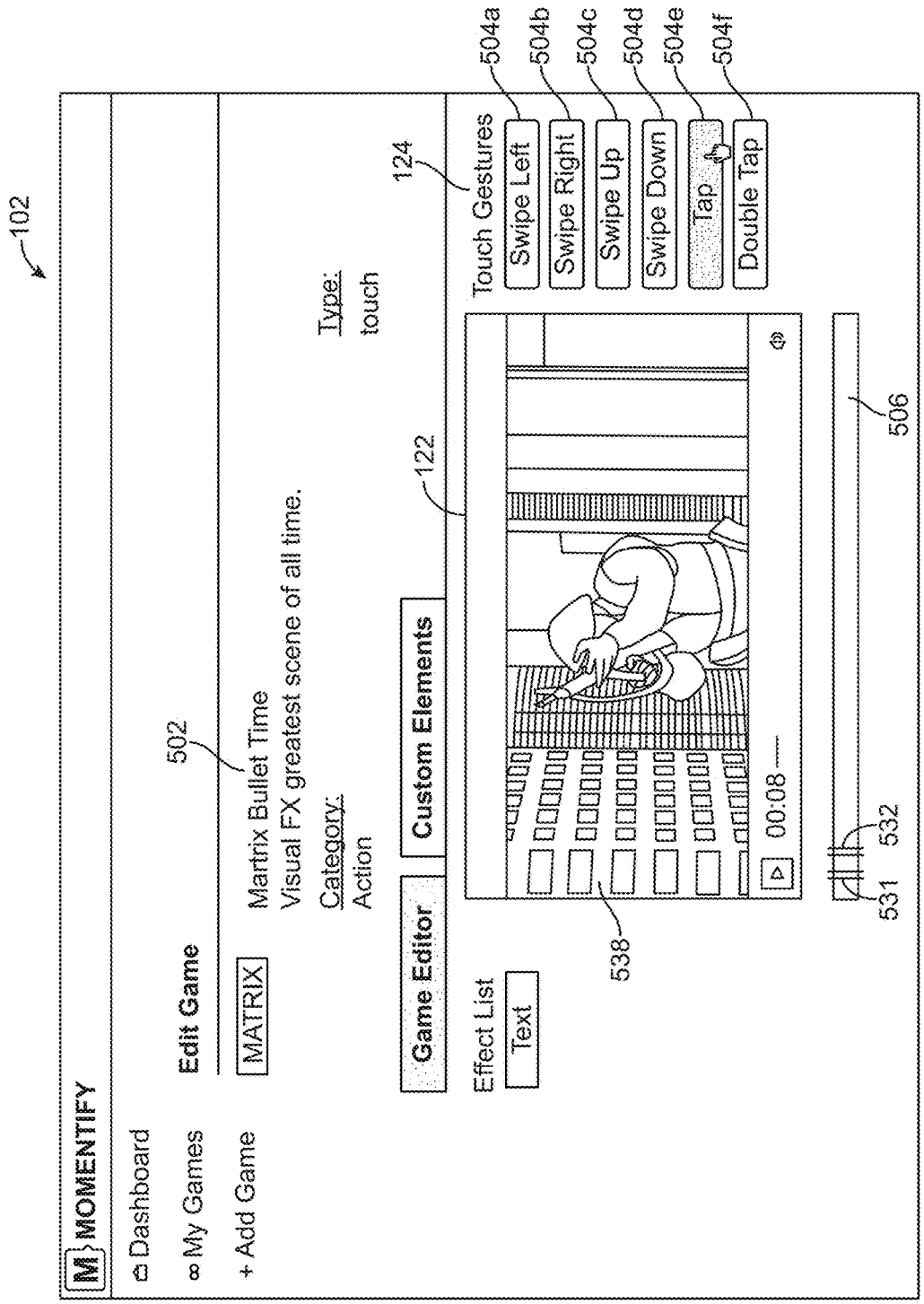
FIG. 8-10 illustrate adding a second gaming gesture to the existing video content for an exemplary embodiment of the present invention.
Figure 9:
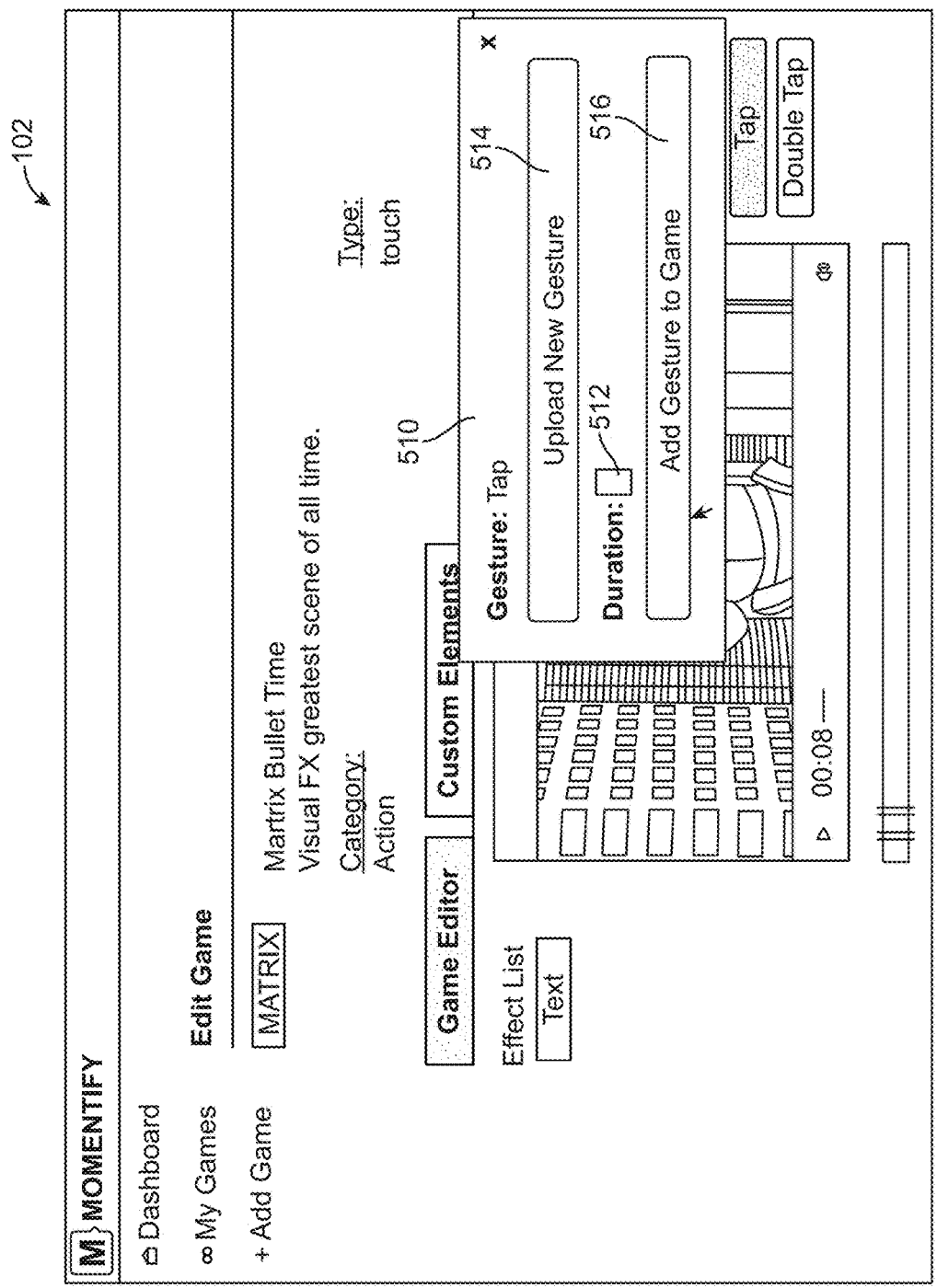
Figure 10:
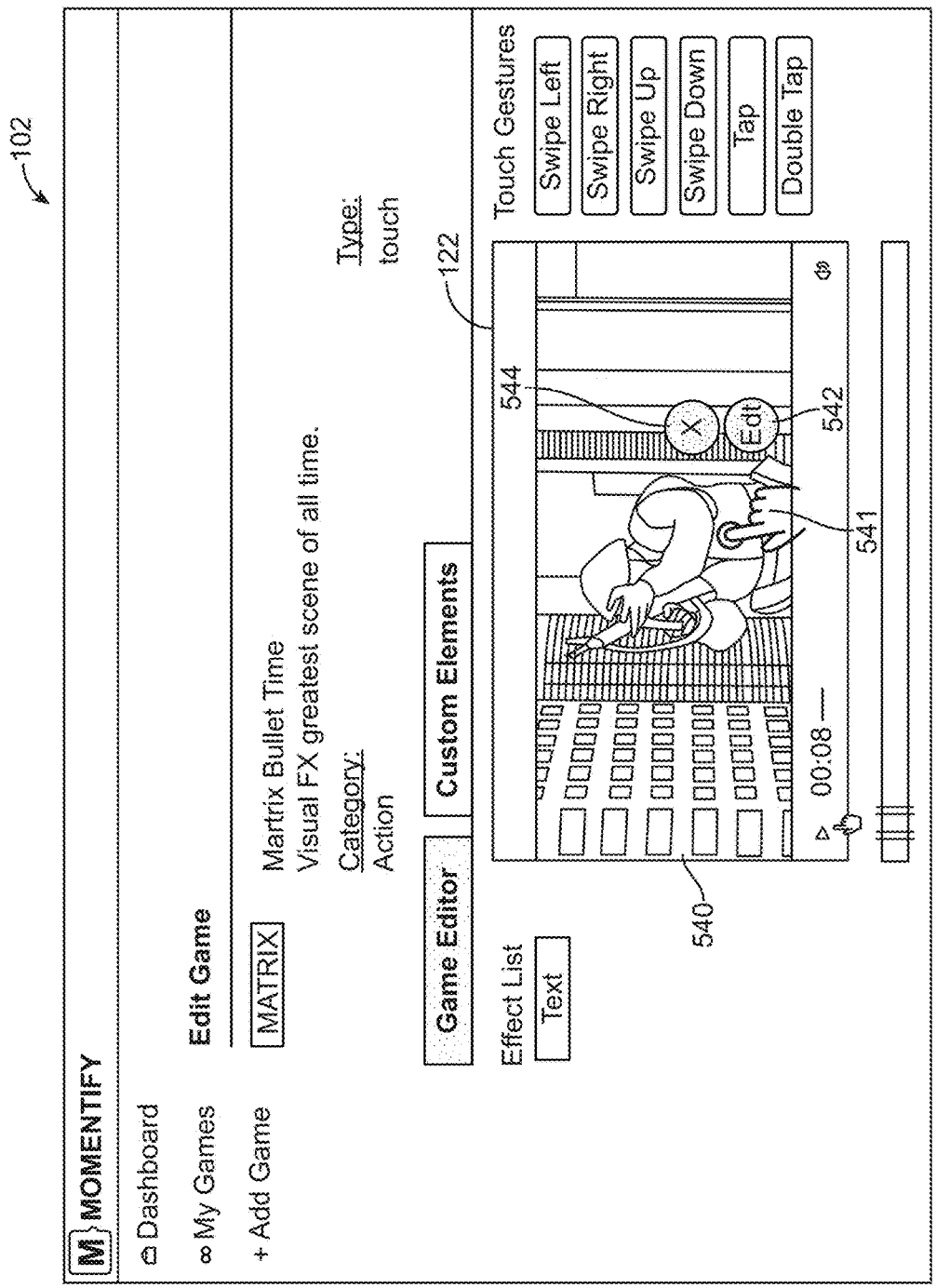

After adding the gaming gesture 521 to the video content, the user may save the modified video content (e.g. the gamified video content) to the database. In some embodiments, the user may add additional gaming gestures to the video content. FIGS. 8-10 illustrate adding a subsequent gaming gesture(s) to the gamified video content. FIGS. 8-10 illustrate a similar operation to FIGS. 5-7.

As illustrated in FIG. 8, a different motion picture frame 538 may be displayed on the video player 122 of the editor module 102 according to the video timeline 506 associated with the motion picture. For example, the motion picture frame 538 corresponds to time 0:08 of the timeline 506 associated with the selected video content displayed on the video player 122. The video timeline 506 may include a first indicator 531 indicating where the first gaming gesture was added to the video content and a second indicator 532 (associated with the displayed frame 538) indicating where the second (e.g. the current) gaming gesture is being added. As discussed above in connection with FIG. 7, the user may select the control button 504*e* for adding a "tap" gaming gesture to the video content. The user may add the gaming gesture "tap" to a desired location on the motion picture frame 538 displayed on the video player 122 by a drag-and-drop action. The editor module 102 may determine the location on the displayed motion picture frame 538 by, for example, determining the coordinates (e.g. x, y coordinates) of the location. The editor module 102 may then associate the gaming gesture "tap" with the determined coordinates as well as with the point in timeline (e.g. with time=0:08, as illustrated in FIG. 8).

As illustrated in FIG. 9, adding the subsequent gesture to the video content (e.g. the motion picture frame 538 of the video content) may cause a pop-up screen 510 to be displayed on the editor module 102. The pop-up screen 510 may ask the user to confirm the addition of the new gaming gesture (e.g. "tap") to the displayed motion picture frame 538. The pop-up screen 510 may also ask the user to specify the duration 512 for the gaming gesture.

The pop-up screen 510 may also allow the user to add a different gaming gesture (different from the previously selected gaming gesture, i.e. "tap" in the exemplary embodiment illustrated in FIG. 9) by selecting a first tab 514 or to accept the addition of the previously selected gaming gesture (e.g. "tap" in the exemplary embodiment illustrated in FIG. 9) to the video content by selecting a second tab 516.

FIG. 10 illustrates the modified gamified video content 540 displayed on the video player 122 of the editor module 102. The modified gamified video content 540 (e.g. the subsequent gamified frame of the initially selected video content) includes the visual representation of the gaming gesture 541. For example, in the exemplary embodiment illustrated in FIGS. 8-10, the added gaming gesture is "tap". Accordingly, the visual representation of the gaming gesture 541 is a hand with a circle displayed around the index finger. During the editing phase, additional editing options (e.g. edit button 542 to select a different gaming gesture or delete button 544 to delete the selected gaming gesture) associated with the visual representation of the gaming gesture 541 may be displayed on the video player 122. After adding the gaming gesture 541 to the video content, the user may save the modified video content (e.g. the gamified video content) to the database. Actions described above in connection with FIGS. 5-7 and/or 8-10 may be repeated as many times as the user desires when creating a gamified multimedia object.

Figure 11:
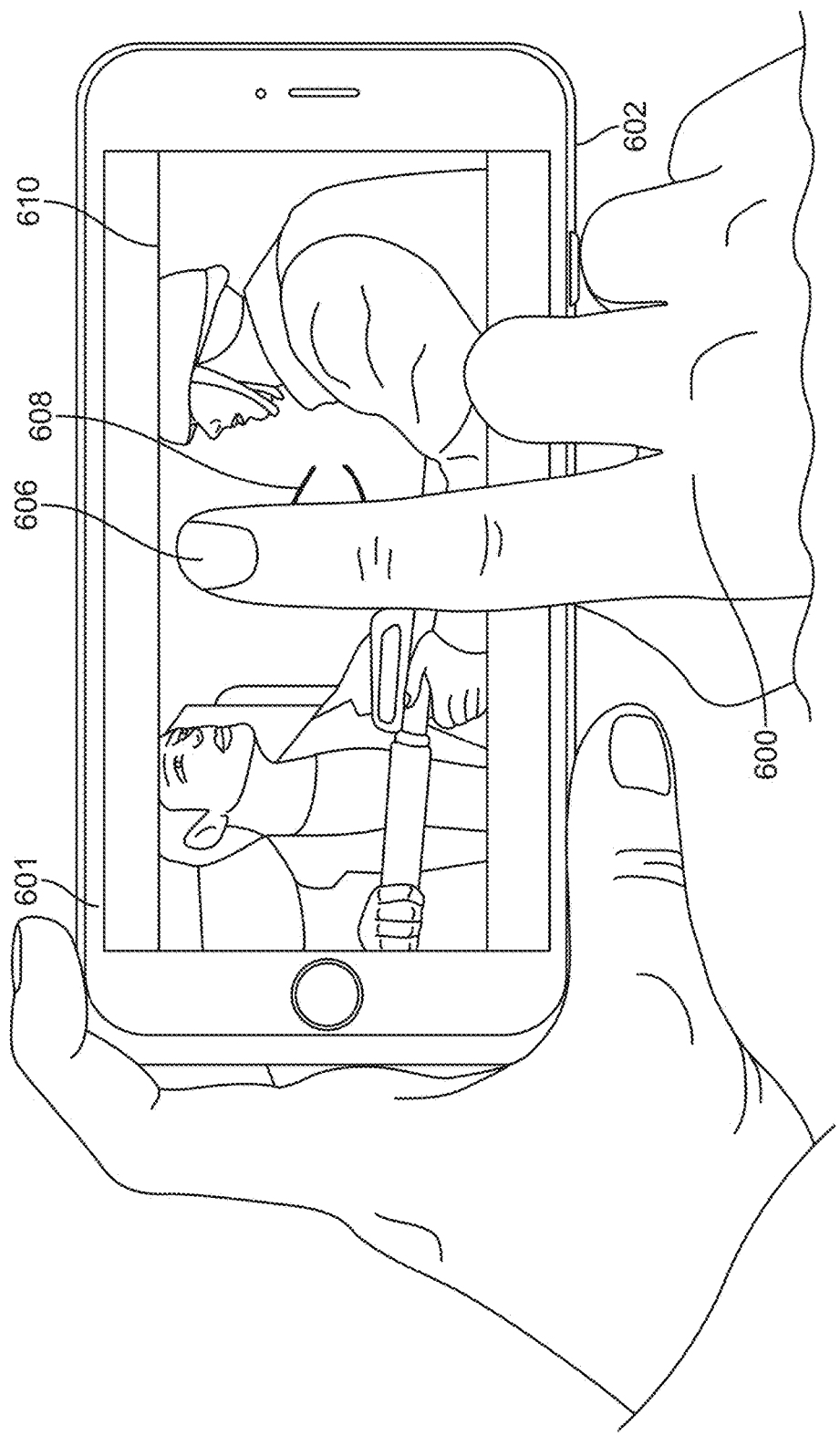
FIG. 11 illustrates the player aspect of the digital multimedia platform where a user interacts with the displayed content whose generation is discussed with respect to FIGS. 5-7 for an exemplary embodiment of the present invention.
Figure 12:
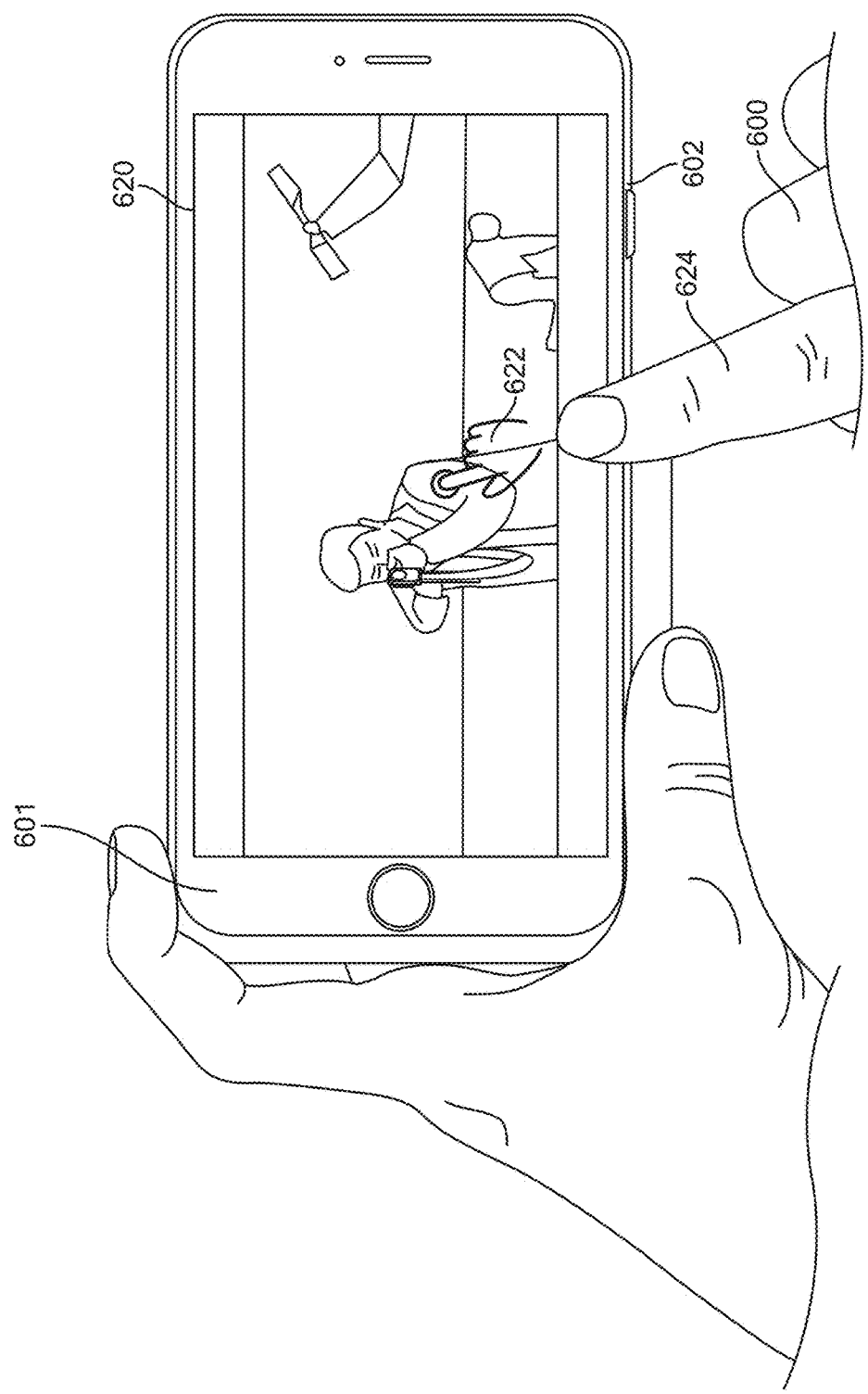
FIG. 12 illustrates the player aspect of the digital multimedia platform where a user interacts with the displayed content whose generation is discussed with respect to FIGS. 8-10 for an exemplary embodiment of the present invention.

FIGS. 11-12 illustrate the player aspect of the digital multimedia platform 100 where a user interacts with the displayed content (e.g. the user plays the gamified video content) whose generation is discussed in connection with FIGS. 5-10.

FIG. 11 illustrates a viewer-user 600 interacting with the mobile application 601 running on a user device 602. The mobile application 601 displays a frame 610 of a gamified video content on the user device 602 using the player module 104 of the digital multimedia platform 100. For example, the user device 602 may access the digital multimedia platform 100 (running on a computer server) over a network, such as the Internet. The gamified video content may be a gamified version of a motion picture including one or more gaming gestures 608 overlaid on one or more frames of the motion picture. The frame 610 of the gamified video content illustrated in FIG. 11 corresponds to the gamified video content generated in FIGS. 5-7. The "swipe up" gaming gesture 608 generated in FIGS. 5-7 is overlaid on the video frame 610 displayed on the user device 602. In FIG. 11, the user 600 provides a gaming input 606 swiping up with his finger. If the control module 120 of the digital multimedia platform 100 determines that the gaming input 606 is received within the allocated time, the control module 120 may determine that the required (e.g. expected) user interaction is completed within the allotted time. As a result, the control module 120 may continue playing the gamified video content and may assign gaming credit (e.g. gaming points) to the viewer-user 600.

When the gamified video content continues to play, the next gaming gesture may be displayed on the screen of the user device 602. FIG. 12 illustrates another frame 620 of the gamified video content whose generation is discussed above in connection with FIGS. 8-10. In FIG. 12, the viewer-user 600 interacts with the mobile application 601 running on the user device 602. The mobile application 601 displays the frame 620 of gamified video content on the user device 602 using the player module 104 of the digital multimedia platform 100. The "tap" gaming gesture 622 generated in FIGS. 8-10 is overlaid on the video frame displayed on the user device 602. In FIG. 12, the viewer-user 600 provides a gaming input 624 tapping with his finger. If the control module 120 of the digital multimedia platform 100 determines that the gaming input 624 is received within the allocated time, the control module 120 may determine that the required (e.g. expected) user interaction is completed within the allotted time. As a result, the control module 120 may continue playing the gamified video content may continue playing and may assign additional gaming credit (e.g. gaming points) to the viewer-user 600.

Figure 13:
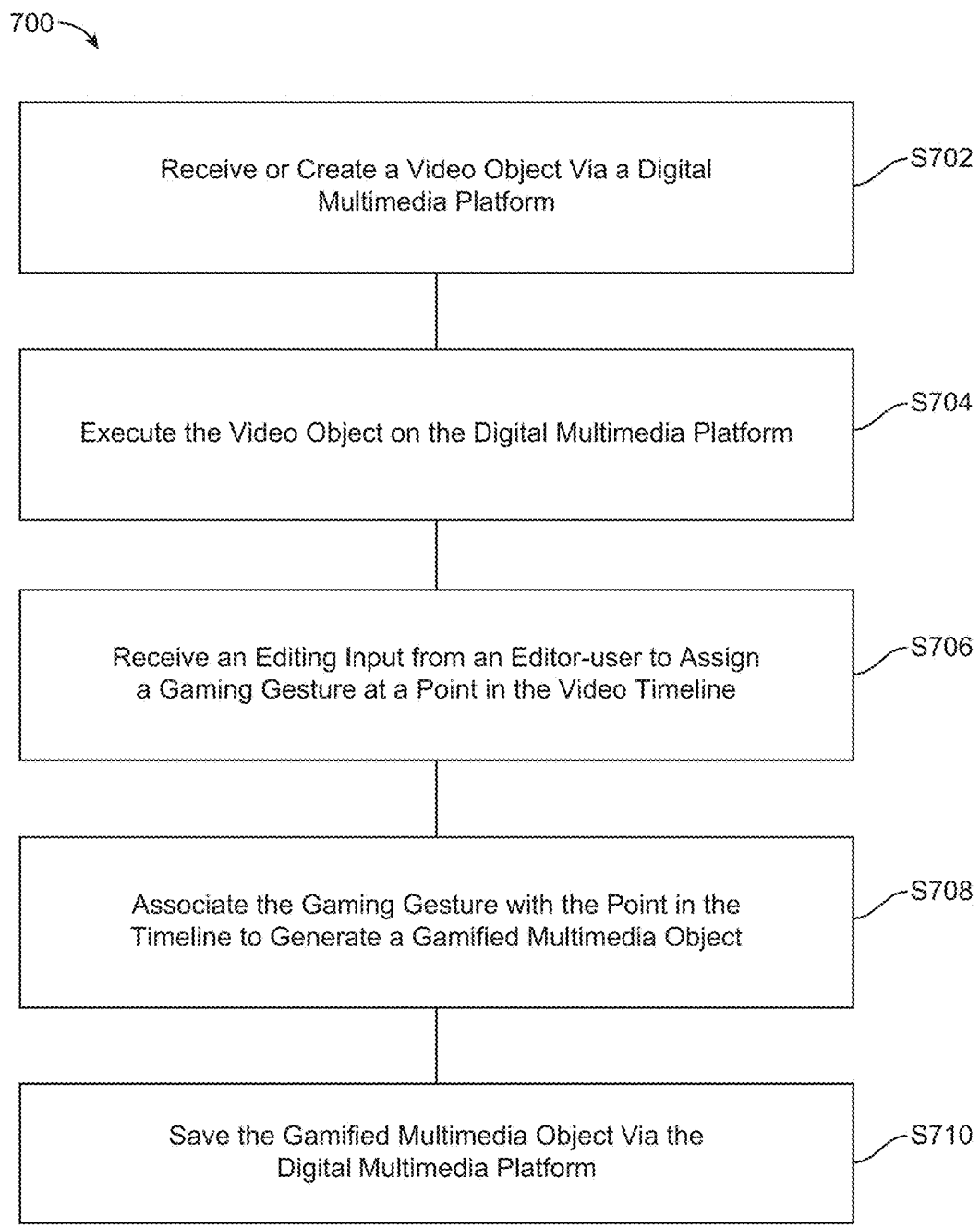
FIG. 13 shows a flowchart of steps illustrating generating a gamified multimedia object according to some embodiments of the invention.

FIG. 13 illustrates a flowchart 700 of steps illustrating generating a gamified multimedia object according to some embodiments of the invention. At step S702, a video object is received by the digital multimedia platform. The video object may be selected among a plurality of existing video objects previously stored on a database accessible by the digital multimedia platform, may be created on the fly using a recording device of a user device or may be in the form of a live stream received from a video signal provider. The video object may have a video content and a video timeline associated with the video content.

At step S704, the video object may be executed on the digital multimedia platform. When the video object is executed on a computing device using the digital multimedia platform, the video content may be played/displayed according to the video timeline. At step S706, an editing input may be received at the digital media platform from a first editor-user. The editing input may be for assigning a gaming gesture at a point in the video timeline (e.g. interaction point). The editing input may be received in real-time (i.e. while the video content is displayed).

At step S708, the digital multimedia platform may associate the gaming gesture with the point in the video timeline to generate a gamified multimedia object having a modified video content and a video timeline associated with the modified video content. The modified video content is generated by modifying the existing video content (retrieved from the database or created/provided by the user). The generated gamified video object may be stored at a storage (e.g. a database) via the digital multimedia platform (step S710).

Figure 14:
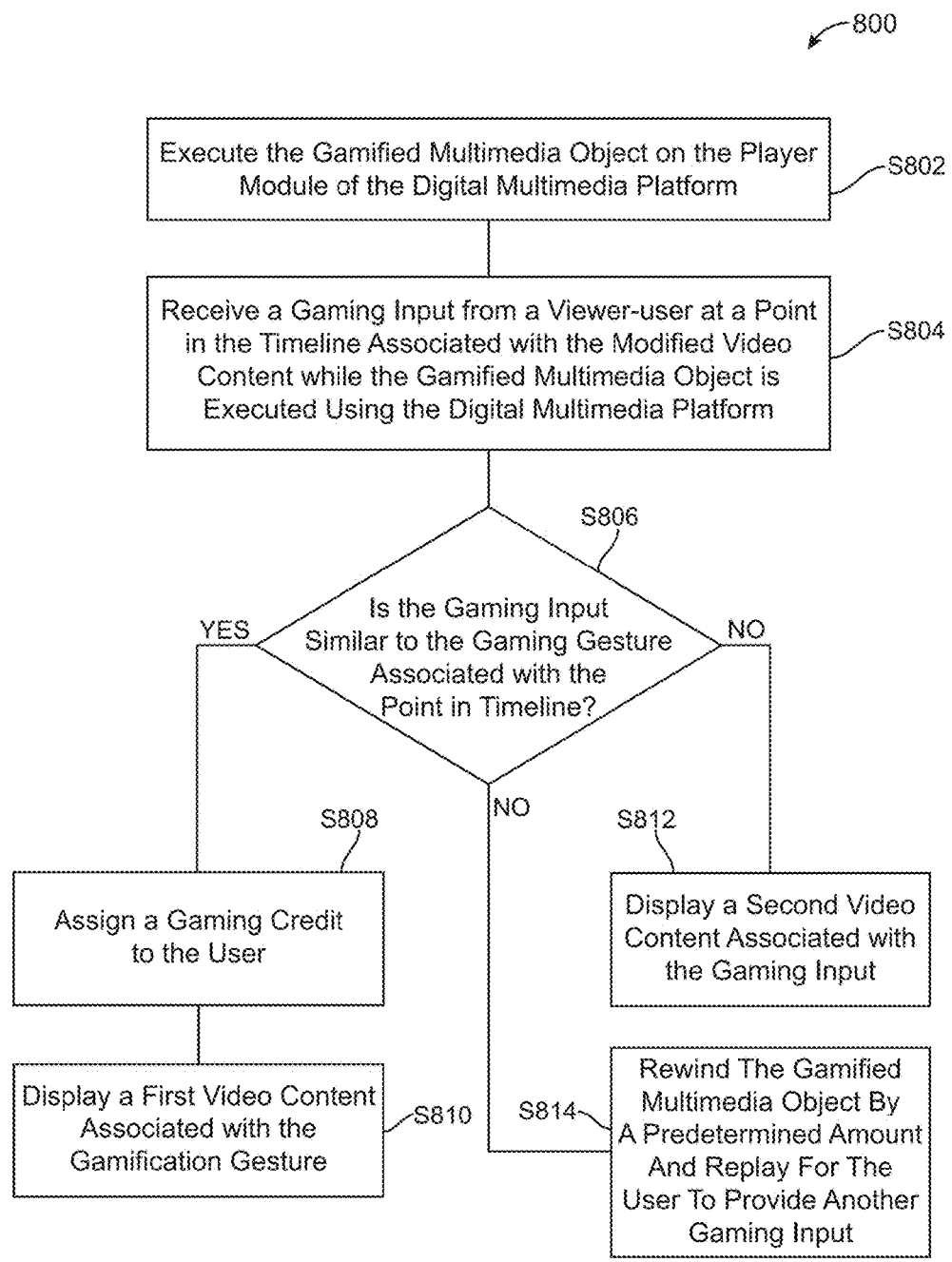
FIG. 14 shows a flowchart of steps illustrating interacting with a gamified multimedia object generated, for example, using the flowchart of steps illustrated in FIG. 13, according to some embodiments of the invention.

FIG. 14 illustrates a flowchart 800 of steps illustrating interacting with a gamified multimedia object generated, for example, using the flowchart of steps illustrated in FIG. 13, according to some embodiments of the invention. At step S802, the digital multimedia platform may execute the gamified multimedia object on the player module of the digital multimedia platform. Executing the gamified multimedia object may play the modified video content (generated, for example, using the steps illustrated in FIG. 13) of the gamified multimedia object according to the video timeline associated with the modified video content.

At step S804, the digital multimedia platform may receive a gaming input from a viewer-user at a point in the video timeline associated with the modified video content while the modified video content plays on the player module of the digital multimedia platform. At step S806, it is determined whether the gaming input received from the viewer-user is the same as the gaming gesture associated with the point in the video timeline associated with the modified video content. That is, it is determined whether the gaming input is the correct (e.g. expected) input that achieves the goal of a portion of the game.

If the gaming input received from the viewer-user is the same as the gaming gesture associated with the point in the video timeline, (i.e. YES to step S806), the digital multimedia platform assigns gaming credit to the user (step S808) and displays a first video content associated with the gaming gesture (step S810). According to various embodiments, the first video content may include the remainder of the original video content (e.g. remainder of the movie), a different video content (e.g. editor-user may have associated a random video with the gaming gesture), or a feedback frame (e.g. a display of earned points, the status in the game, the status compared to other viewer-users or gamers, etc.).

If the gaming input received from the viewer-user is different from the gaming gesture associated with the point in the video timeline, (i.e. NO to step S806), the digital multimedia platform displays a second video content associated with the gaming gesture (step S812). According to various embodiments, the second video content may include the remainder of the original video content (e.g. remainder of the movie) or a different video content (e.g. editor-user may have associated a random video with the gaming gesture). In some embodiments, instead of displaying the second video content, the viewer-user may be prevented from viewing the remainder of the original video content (e.g. game over).

According to various embodiments, if the gaming input received from the viewer-user is different from the gaming gesture associated with the point in the video timeline, (i.e. NO to step S806), the digital multimedia platform may rewind the gamified object by a predetermined amount (e.g. 2 or 3 seconds, or a few frames) and replay the rewound portion for the user to provide another gaming input (step S814).

In some embodiments, step S814 may be performed when no gaming input is received from the user or the user device during the allocated time. Accordingly, if the user fails to provide an input during the allocated time, the platform may give another chance (or a few more chances) to the user to provide a gaming input at the relevant point in the video timeline.

Embodiments provide a digital multimedia platform for allowing users to generate gamified video contents from exiting video contents. For example, a user may generate a game from a movie or an existing video (e.g. a video footage of user's kid or pet). Then, a viewer-user may view the gamified video content and play the game generated by the editor-user. The viewer-user and the editor-user may be the same person. In some embodiments, a plurality of editor-users create the gamified video content and a plurality of viewer-users interact with the gamified video content (e.g. play the game) generated by the editor-users. A viewer-user is permitted to make choices or otherwise interact in real-time at decision points within an allocated time throughout the video (e.g. the gamified video content). Decision points can occur at any time and in any number during a video playback. Decision points can be predefined, occurring at fixed points or during fixed periods in the video timeline. The gamified video content may also include availability indicators which are markings on the display to visually indicate the availability status of requested input at particular time. If the viewer-user does not make a selection at a decision point within the allocated time, the video playback may continue to play according to the video timeline implemented by the editor-user.

Figure 15:
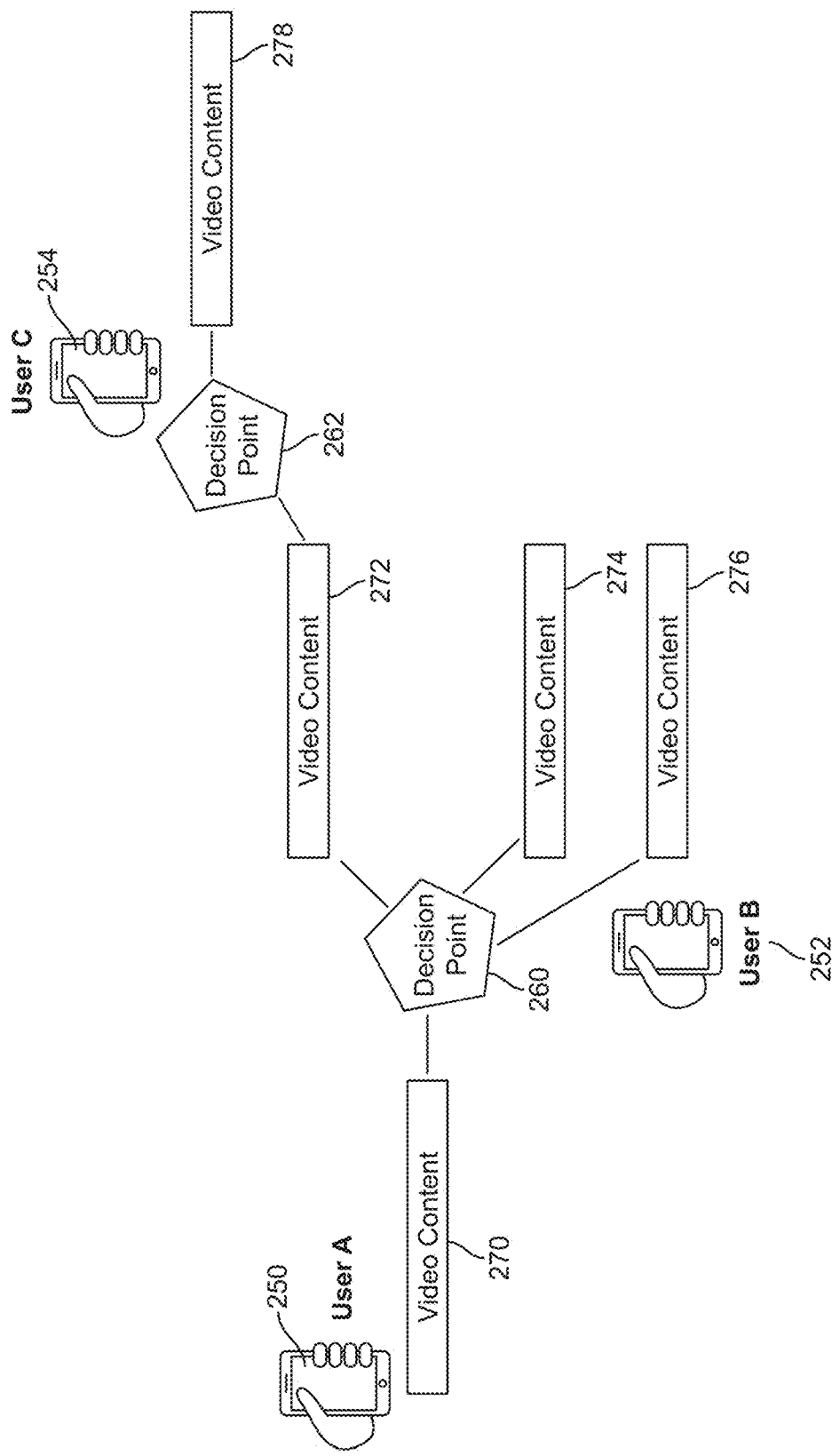
FIG. 15 illustrates multiple users interacting with the digital multimedia platform to edit a source video object.

In some embodiments, users can use objects submitted by other users to create different experiences from the same video content. FIG. 15 illustrates multiple users interacting with the digital multimedia platform to edit a source video object. For example, a first user 250 may upload or browse from the database a source video object having a video content 270. The first user 250 or a second user 252 may insert a decision point 260 to the video timeline of the source video object. A plurality of alternative video timelines (and video contents) may be defined at the decision point 260. For example, the first user 250 may define a first video content 272 and a second video content 274 based on, for example, a user input that is received at the decision point 260. The second user 252 may define an additional third video content 276 at the decision point 260 based on, for example, a user input different than what was defined by the second user 252.

According to various embodiments, a third user 254 may continue modifying the source video object by defining a new decision point 262. The new decision point 262 may be defined at any of the alternative timelines that may exist. For example, as illustrated in FIG. 15, the third user 254 may define the new decision point 262 at video content 272. The third user 254 may associate a new video content 278 at decision point 262 which may be dependent upon a user input that will be received at decision point 262. Thus, users may add new content as alternative video playbacks to a decision point, or change decision points and/or results of inputs on these points. Interactive objects created by method can be branched and extended infinitely by user participation on the digital multimedia platform.

In some embodiments, users may create decision points and select inputs related to that decision points while capturing/recording the video with the provided app by the platform for the users device type. This will allow users to create interactive video objects instantly without editing the video content and/or the video object.

The various participants and elements described herein with reference to FIGS. 1-15 may operate one or more computer apparatuses to facilitate the functions described herein. Any of the elements in FIGS. 1-15, including any servers or databases, may use any suitable number of subsystems to facilitate the functions described herein.

Figure 16:
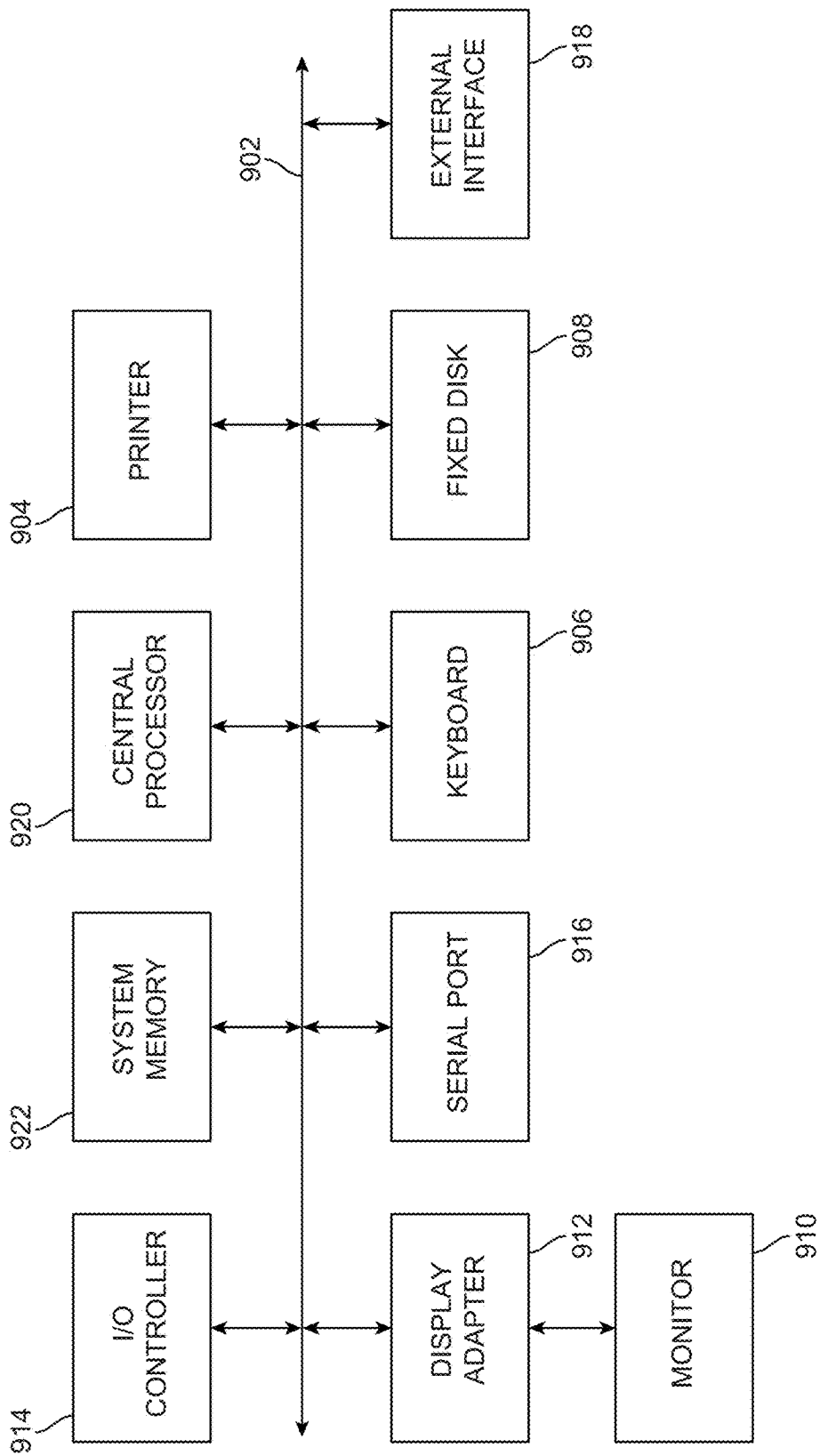
FIG. 16 is a block diagram of a computer apparatus that may be used to implement embodiments disclosed herein, according to an embodiment of the invention.

Examples of such subsystems or components are shown in FIG. 16. The subsystems shown in FIG. 16 are interconnected via a system bus 902. Additional subsystems such as a printer 904, keyboard 906, fixed disk 908 (or other memory comprising computer readable media), monitor 910, which is coupled to display adapter 912, and others are shown. Peripherals and input/output (I/O) devices, which couple to I/O controller 914 (which can be a processor or other suitable controller), can be connected to the computer system by any number of means known in the art, such as serial port 916. For example, serial port 916 or external interface 918 can be used to connect the computer apparatus to a wide area network such as the Internet, a mouse input device, or a scanner. The interconnection via system bus allows the central processor 920 to communicate with each subsystem and to control the execution of instructions from system memory 922 or the fixed disk 908, as well as the exchange of information between subsystems. The system memory 922 and/or the fixed disk 908 may embody a computer readable medium.

Embodiments of the invention are not limited to the above-described embodiments. For example, although separate functional blocks are shown for an issuer, payment processing network, and acquirer, some entities perform all of these functions and may be included in embodiments of invention.

Specific details regarding some of the above-described aspects are provided above. The specific details of the specific aspects may be combined in any suitable manner without departing from the spirit and scope of embodiments of the invention. For example, back end processing, data analysis, data collection, and other transactions may all be combined in some embodiments of the invention. However, other embodiments of the invention may be directed to specific embodiments relating to each individual aspect, or specific combinations of these individual aspects.

It should be understood that the present invention as described above can be implemented in the form of control logic using computer software (stored in a tangible physical medium) in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A computer-implemented method comprising:
   receiving a video object using a digital multimedia platform, the video object having a video content and a video timeline associated with the video content, wherein the video object includes a live video stream;
   executing the video object on the digital multimedia platform, wherein executing the video object displays the video content according to the video timeline;
   receiving an editing input from a first editor-user to assign a gaming gesture at a point in the video timeline while displaying the video content;
   associating the gaming gesture with the point in the video timeline to generate a gamified multimedia object having a modified video content and a video timeline associated with the modified video content;
   storing the gamified multimedia object using the digital multimedia platform;
   executing the gamified multimedia object using the digital multimedia platform, wherein executing the gamified multimedia object displays the modified video content according to the video timeline associated with the modified video content;
   receiving a first gaming input from a viewer-user at a point in the video timeline associated with the modified video content while the gamified multimedia object is executed; and
   if the first gaming input is substantially similar to the gaming gesture associated with the point in the video timeline,
   assigning a gaming credit to the viewer-user, and
   displaying a first video content associated with the gaming gesture,
   if the first gaming input is different from the gaming gesture associated with the point in the video timeline,
   displaying a second video content associated with the first gaming input, or
   rewinding the modified video content by a predetermined amount, and
   replaying a rewound portion of the modified video content and receiving a second gaming input from the viewer-user at the point in the video timeline associated with the modified video content while the gamified multimedia object is executed.

2. The method of claim 1, further comprising:
   listening to user inputs through available input devices when the gaming gesture is displayed while executing the gamified multimedia object using the digital multimedia platform, wherein the user inputs include the first gaming input and the second gaming input.

3. The method of claim 2, further comprising:
   displaying a transparent layer on or in proximity of the modified video content to receive the first gaming input or the second gaming input.

4. The method of claim 2, wherein the first gaming input or the second gaming input includes one or more of a haptic input, a vocal input, an eye movement input or a signal received from a control device.

5. The method of claim 1, wherein the gaming gesture is associated with an allocated time during which the gaming gesture is to be performed.

6. The method of claim 1, wherein the gaming gesture is associated with an allocated time during which the first gaming input is to be received.

7. The method of claim 6, further comprises:
   rewinding the modified video content by the predetermined amount, and
   replaying the rewound portion of the modified video content when no gaming input is received during the allocated time.

8. The method of claim 1, further comprising:
   receiving an editing input from a second editor-user to assign a second gaming gesture at a second point in the video timeline while displaying the modified video content;
   associating the second gaming gesture with the second point in the video timeline to generate a second gamified multimedia object having a second modified video content; and
   storing the second gamified multimedia object using the digital multimedia platform.

9. The method of claim 1, wherein associating the gaming gesture with the point in the video timeline comprises:
   associating the gaming gesture with one or more frames of the video content.

10. The method of claim 1, wherein the video timeline associated with the modified video content is the same as the video timeline associated with the video content.

11. The method of claim 1, further comprising:
    displaying a gesture pane including a plurality of gaming gestures, wherein the gaming gesture is selected among the plurality of gaming gestures; and
    overlaying the gaming gesture on a frame of the video content displayed at a time when the editing input is received.

12. An interactive digital multimedia platform comprising:
    a database;
    a server computer comprising a processor and a computer-readable medium coupled to the processor, the computer-readable medium comprising instructions that, when executed by the processor, cause the processor to:
    receive a video object having a video content and a video timeline associated with the video content, wherein the video object includes a live video stream;
    execute the video object using a player module of the server computer, wherein executing the video object displays the video content according to the video timeline;
    receive, using an editor module of the server computer, an editing input from a first editor-user to assign a gaming gesture at a point in the video timeline while displaying the video content;

associate, using the editor module of the server computer, the gaming gesture with the point in the video timeline to generate a gamified multimedia object having a modified video content and a video timeline associated with the modified video content;

store the gamified multimedia object at the database;

execute the gamified multimedia object using the player module of the server computer, wherein executing the gamified multimedia object displays the modified video content according to the video timeline associated with the modified video content;

receive, via the player module, a first gaming input from a viewer-user at a point in the video timeline associated with the modified video content while the gamified multimedia object is executed;

determine, using a control module of the server computer, that the first gaming input is different from the gaming gesture associated with the point in the video timeline;

display a second video content associated with the first gaming input; or rewind, using the player module, the modified video content by a predetermined amount; and replay, using the player module, a rewound portion of the modified video content and receiving a second gaming input from the viewer-user at the point in the video timeline associated with the modified video content while the gamified multimedia object is executed.

13. The interactive digital multimedia platform of claim 12, wherein the computer-readable medium comprising instructions that, when executed by the processor, further cause the processor to:

execute the gamified multimedia object using the player module of the server computer, wherein executing the gamified multimedia object displays the modified video content according to the video timeline associated with the modified video content;

receive, via the player module, a first gaming input from a viewer-user at a point in the timeline associated with the modified video content while the gamified multimedia object is executed;

determine, using the control module of the server computer, that the first gaming input is substantially similar to the gaming gesture associated with the point in the video timeline;

assign a gaming credit to the viewer-user; and display a first video content associated with the gaming gesture.

14. The interactive digital multimedia platform of claim 13, wherein the computer-readable medium comprising instructions that, when executed by the processor, further cause the processor to:

listen to, using the player module, user inputs through available input devices when the gaming gesture is displayed while executing the gamified multimedia object using the digital multimedia platform, wherein the user inputs include the first gaming input and the second gaming input.

15. The interactive digital multimedia platform of claim 13, wherein the computer-readable medium comprising instructions that, when executed by the processor, further cause the processor to:

display, using the editor module, a transparent layer on or in proximity of the modified video content to receive the first gaming input or the second gaming input.

16. The interactive digital multimedia platform of claim 12, wherein the gaming gesture is associated with an allocated time during which the gaming gesture is to be performed.

17. The interactive digital multimedia platform of claim 12, wherein the computer-readable medium comprising instructions that, when executed by the processor, further cause the processor to:

display, using the editor module, a gesture pane including a plurality of gaming gestures, wherein the gaming gesture is selected among the plurality of gaming gestures; and overlay, using the editor module, the gaming gesture on a frame of the video content displayed at a time when the editing input is received.

* * * * *